United States Patent
Bublitz et al.

(10) Patent No.: US 7,488,924 B2
(45) Date of Patent: Feb. 10, 2009

(54) METHOD FOR DETERMINING THE FOCAL POSITION DURING IMAGING OF A SAMPLE USING AN INCLINED POSITION RECEIVING DEVICE

(75) Inventors: Daniel Bublitz, Jena (DE); Dieter Graefe, Jena (DE); Peter Westphal, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 20 days.

(21) Appl. No.: 10/554,899

(22) PCT Filed: Apr. 27, 2004

(86) PCT No.: PCT/EP2004/004427

§ 371 (c)(1), (2), (4) Date: Nov. 3, 2006

(87) PCT Pub. No.: WO2004/097493

PCT Pub. Date: Nov. 11, 2004

(65) Prior Publication Data

US 2007/0102620 A1    May 10, 2007

(30) Foreign Application Priority Data

Apr. 29, 2003   (DE) ................................ 103 19 182

(51) Int. Cl.
*G02B 7/04*    (2006.01)
*G02B 27/40*   (2006.01)
*G02B 27/64*   (2006.01)

(52) U.S. Cl. .................. 250/201.3; 359/383; 250/201.7

(58) Field of Classification Search ... 250/201.2–201.4, 250/201.7; 359/368, 382, 383
See application file for complete search history.

(56) References Cited

U.S. PATENT DOCUMENTS

| | | | |
|---|---|---|---|
| 2,524,807 | A | 10/1950 | Kallmann |
| 5,633,721 | A | 5/1997 | Mizutani |
| 5,867,604 | A | 2/1999 | Ben-Levy et al. |
| 5,932,872 | A | 8/1999 | Price |
| 5,991,004 | A | 11/1999 | Wallace et al. |

(Continued)

FOREIGN PATENT DOCUMENTS

| | | |
|---|---|---|
| DE | 695 08 248 T2 | 11/1999 |
| DE | 101 27 284 A1 | 12/2002 |
| JP | 11-183154 | 7/1999 |

*Primary Examiner*—Thanh X Luu
*Assistant Examiner*—Francis M Legasse, Jr.
(74) *Attorney, Agent, or Firm*—Patterson Thuente Skaar Christensen, P.A.

(57) ABSTRACT

The invention refers to a process for determining the focus position when imaging a specimen (4) with a field stop imaged onto the specimen detecting this image using a position-sensitive receiving-device inclined relative to the field stop defining the focus position by means of intensity distribution in the receiving device. The invention also refers to set-ups as regards implementation of the process according to the invention.

According to the invention, in a process of the above-mentioned type, imaging of the field stop onto the specimen (4) is at least partially superposed by an optical lattice; the position-sensitive receiving device is used to determine intensity values for the light reflected by the specimen; these intensity values are assigned to positions in the receiving device; position-related contrast values are determined from the position-related intensity values; the position of the contrast focus in the receiving device as equivalent of the current focus position is determined using these contrast values.

12 Claims, 12 Drawing Sheets

U.S. PATENT DOCUMENTS 6,353,478 B1    3/2002    Rudd et al.
6,654,101 B2 *  11/2003   Suzuki et al. .............. 355/53
6,825,454 B2    11/2004   Czarnetzki et al.
2003/0075668 A1 * 4/2003  Nagasawa ............... 250/201.3

* cited by examiner

METHOD FOR DETERMINING THE FOCAL POSITION DURING IMAGING OF A SAMPLE USING AN INCLINED POSITION RECEIVING DEVICE

The invention refers to a process for determining the focus position when imaging a specimen (4) with a field stop imaged onto the specimen detecting this image using a position-sensitive receiving-device inclined relative to the field stop defining the focus position by means of intensity distribution in the receiving device. The invention also refers to set-ups as regards implementation of the process according to the invention.

Precise images of a specimen or a piece of specimen using imaging optics requires to put the specimen exactly in the focus position of the imaging optics. In case the image is out of focus, it is important to learn by what value and in what direction the position of the specimen is to be changed relative to the imaging optics and to derive respective adjusting commands, if applicable, which can be used for focusing.

In this context, triangulation processes, imaging processes with contrast evaluation and the position fix using beveled confocal aperture slot are substantially known.

In the triangulation processes, a collimated laser beam is reflected into the pupil plane of an imaging lens and the Z position of the laser light reflected by the specimen is derived from the course of this laser beam relative to the imaging optical path.

An essential disadvantage of this process is that image distortions are produced due to imaging the laser light in planes of the specimen differing in depth causing the signal detected to vary heavily over a given depth of sharpness range.

The accuracy when determining the focus position unfortunately depends on whether the result of measurement is determined in the center or the periphery of the capture range of a detector. To compensate this effect, the focus position is to be determined in several iterative steps causing this process to be relatively time-consuming.

In imaging processes with contrast evaluation, the specimen is illuminated according to latticed intensity distribution by positioning a lattice in the field stop plane of the illumination optical path. The specimen illuminated that way is imaged onto a receiving device. In this way, a series of images with different distances between the imaging optics is and the specimen is recorded selecting the image with the highest contrast from this series. The distance between the imaging optics and the specimen assigned to this image is classified as optimal focus distance.

The disadvantage is that for recording the images series, many different z positions are to be approached with high precision causing this process to be relatively time-consuming.

In a position fix using beveled confocal aperture slots, an aperture slot is positioned in the field stop plane of the illumination optical path and imaged onto the specimen. The light reflected by the specimen is directed at a CCD line assigned inclined relative to the aperture slot determining the position of the CCD line where the reflected light is maximum. As in this process, the focus position can be calculated using a single image onto the line, the result of focus calculation is available within a relatively short time.

However, there are disadvantages insofar as fluctuations in intensity may result from impurities in the specimen or disturbing structures in the specimen surface possibly leading to faulty results of measurement. The main problem of this process are the mayor adjustments needed when imaging the gap onto the CCD line as the gap (or the line) is to be very narrow to obtain high precision. Perfectly corrected imaging optics also are required.

During chip manufacture in particular, structures increasingly fine and thin are aimed at. This results in increasingly high requirements for the inspection processes used to verify the manufacturing accuracy. Accordingly, increasingly quick and precise focusing, preferably without interrupting the manufacturing sequence, is called for.

Based upon this, the underlying tasks of this invention is to further increase accuracy when determining the focus position and also to indicate set-ups allowing the implementation of such more precise process.

The present invention can be assigned to the subject group of position fix using beveled confocal aperture slots.

According to the invention, in a process of the above-mentioned type imaging a field stop onto the specimen and with a an image at least partially superposed by an optical lattice using a position-sensitive receiving device inclined relative to the field stop, intensity values for the light reflected by the specimen are determined. These intensity values are assigned to positions in the receiving device. Position-related contrast values are determined from the position-related intensity values and the position of the contrast focus in the receiving device as equivalent of the current focus position is determined using these contrast values.

Unlike the relevant processes according to prior art, the focus position is not determined as equivalent of the intensity maximum in the receiving device but the superposing of the aperture imaging in the specimen with imaging of an optical lattice allows to determine position-related contrast values using them as a base for determining the current focus position.

Compared to the other process previously known, this offers the essential advantage of significantly reduced adjustment needs. Also the results when determining the focus position are no longer that much distorted by underground light, impurities in the specimen or disturbing specimen structures. In this respect, the invention provides a quick process ensuring a significantly higher precision compared to the prior art.

A preferred design option of the process according to the invention provides for determining position-related contrast values $I(y_i)$ according to the function $$\forall i I(y_i) := |I(x_i) - I(x_{i+n})|$$

$I(x_i)$ stands for intensity values assigned to a position $x_i$ in the receiving device whereas $I(x_{i+n})$ stands for intensity values assigned to an adjacent position $x_{i+n}$ preferably selecting n in the range of 1 . . . 20.

After determining the position-related contrast values, a location is determined as equivalent of the current focus position $P_f$ according to the function $$P_f := \frac{\sum_i y_i \cdot I(y_i)}{\sum_i I(y_i)}$$

All contrast values greater than a default minimum value $I_{min.}$ are included here.

Through this, high precision and reduced adjustment needs compared to the prior art can already be achieved in many applications.

For even higher precision requirements, a location $P_f'$ is determined in a first step according to the function $$P_f := \frac{\sum_i y_i \cdot I(y_i)}{\sum_i I(y_i)}$$

for all contrast values $I(y_i)$ greater than a default minimum value $I_{min}$. Subsequently, a location is determined in a second step as equivalent of the current focus position $P_f$ according to the function $$P'_f := \frac{\sum_i y_i \cdot I(y_i)}{\sum_i I(y_i)}$$

for all contrast values $I(y_i)$ greater than a minimum value $I'_{min}$ not being farther away from the location $P'_f$ than by a default distance a.

The minimum values $I_{min}$ and $I'_{min}$ fixed for the first and second step respectively can be equal or unequal.

Preferably, a field stop is used as aperture slot, an absorption lattice as optical lattice in the form of a band-shaped mask and a CCD line as receiving device. In this case, the positions $x_i$ are characterized by the consecutive numbering of the sensor elements in the CCD line, hereinafter referred to as pixel. In case the CCD line i.e. has 2.400 pixels, their positions are defined using $x_1$ to $x_{2400}$. The distance a between two pixels in the CCD line is then indicated with a number of pixels with default values for a preferably in the range of 10 to 1000.

In a more advanced design that can be used for automatic manufacturing control in particular, an input signal for automatic focusing is generated from the distance b between a location in the receiving device corresponding to the ideal focus position $P''_f$ in the receiving device measured in the receiving device and the location corresponding to the current focus position $P_f$.

The input signal is preferably used for changing the distance $\Delta z$ between the specimen and the imaging optics until the locations $P_f$ imaged onto the CCD line align with the location $P''_f$ preset according to an instrument calibration.

Such control devices are known from prior art and do not require any further explanation at this point. In particular, step motors coupled to a specimen table have proved themselves for driving such control devices.

Another invention design is not only suitable for determining the current focus position but also for defining a tipping in the focus plane related to the reception surface of a detector in the receiving device.

In this regard, it is intended to use a rectangle aperture as aperture and a CCD matrix as receiving device and a optical lattice consisting of two lattice masks inclined against each other in the lattice plane with each of them showing several band-shaped masks running parallel to each other. It is intended to generate an image onto the specimen of each of the band-shaped masks and to determine the position of the contrast focus for each mask imaged using the CCD matrix according to the technique described further above and in the claims 2 to 4 equally.

In this case, the positions of the contrast focus on each mask imaged are the equivalent of a current focus position. According to the invention, the course and inclination of the two connecting lines are determined by the contrast focuses and, as a result, by the tipping angle of the focus plane related to the reception surface of the CCD matrix as described in more detail further below.

Here also it is quite conceivable to receive an input signal from the tipping angle of the focus plane determined related to the reception surface plane of the CCD matrix which can be used for compensation of the tipping angle using a control device for influencing the specimen inclination relative to the optical axis of the imaging optical path.

In each of the afore-mentioned design option of the invention, the gap length of the optical lattices are preset according to the reflection capacity of a selected piece of specimen and/or the intensity of scattered or reflected, and consequently, disturbing light. To increase accuracy when determining the contrast focus, the gap length should be preset the smaller, the lower the reflection capacity of the piece of specimen is or the more intense the disturbing scattered or reflected light is.

Also it may prove advantageous, for further processing of the intensity values, to first average the intensity values of adjacent pixels over a period of the lattice imaged and to then determine the deviations of the intensity signal $I_{ist}$ (actual value) received from a default intensity signal $I_{soll}$ (setpoint value) and eventually to correct the contrast values according to the difference resulting.

The advantage is that first, only one intensity value, namely the averaged intensity signal $I_{ist}$, is to be determined. Taking as a basis the deviation of this intensity signal $I_{ist}$ from an intensity signal $I_{soll}$ to be expected, the contrast values are corrected so that failures due to dirt particles in the optical path or a specimen irregularly reflecting are compensated.

The intensity values of adjacent pixels can be averaged according to the function $$I(x_i) := \frac{1}{n}\sum_{j=0}^{n} J\left(x_{i+j-\frac{n}{2}}\right)$$

for all $x_i$ with n=2 ... 100 with n preferably corresponding to the number of pixels per grating period.

The invention also refers to a set-up for implementing the process steps described so far, which may be a microscope se-up in particular, including: a light source for generating an illumination optical path, an imaging optics used for directing the illumination optical path at the specimen and a camera set up in the imaging optical path with a gap opening superposed by a lattice mask positioned in the illumination optical path,
   a detection optical path deflected from the imaging optical path directed at a CCD line,
   a CCD line including an angle of $\alpha \neq 90°$ with the optical axis of the detection optical path,
   a CCD line connected with an evaluation device for determining position-related intensity values $I(x_i)$ and position-related contrast values $I(y_i)$ and
   the evaluation device for determining the position of the contrast focus in the CCD line as an equivalent of the current focus position.

An advantage is to associate the gap opening with an aperture defining the perimeter and size of an image detail in the specimen, positioned in the field stop plane with the aperture aligned centrical to the illumination optical path and the gap opening in the periphery of the illumination optical path.

In a design option of the set-up according to the invention suitable in particular for observing and examining specimen with highly scattering surfaces, the aperture should be aligned vertical to the optical axis whereas the gap opening includes an angle with the optical axis corresponding to the angle by which the CCD line is inclined against the optical axis of the detection optical path with the optical path length between the specimen and the gap opening equaling the optical path length between the specimen and the CCD line.

The evaluation device can i.e. include a difference former determining position-related contrast values $I(y_i)$ according to the function $$\forall i I(y_i) := |I(x_i) - I(x_{i+n})|$$

with the intensity values $I(x_i)$ and $I(x_{i+n})$ respectively assigned to the positions $x_i$ and $x_{i+n}$ and the evaluation device also equipped with a computation circuit determining the contrast focus as equivalent of the current focus position n according to the function $$P_f := \frac{\sum_i y_i \cdot I(y_i)}{\sum_i I(y_i)}$$

for all contrast values $I(y_i)$ greater than a default minimum value $I_{min}$.

In the CCD line, the value n defines the distance of adjacent positions to each other. In this respect, n is variable and is preset according to the application with n=1 . . . 20.

Particularly for applications related to devices for automatic biochip manufacture whose control of finishing accuracy also is automated, a computation circuit is provided for in the evaluation device used for determining the distance b between the location corresponding to the current focus position $P_f$ in the CCD line and a location corresponding to the ideal focus position $P_f''$ in the CCD line. This provides a measure for deviation from the ideal focus position.

Hence it is also advantageous if the configuration of the evaluation device allows determination of an input signal from deviation from the ideal focus position and is connected to a control device for correcting the focus position, i.e. by changing the distance $\Delta z$ between the specimen and the imaging optics. This is to control the distance between the current focus position and the ideal focus position making adjustments until the distance b tends to 0 so representing the ideal focus position.

To obtain optimal results when determining the current focus position and placement, it is advantageous to adapt the frequency of the lattice respectively used for imaging onto the specimen from the ideal focus position to the optical resolution limit of the imaging optics. Preferably, five pixels of the CCD line in each case should correspond to one grating period.

When imaging plain specimen surfaces, the process according to the invention and the set-up previously described can also be used for leveling purposes by determining the inclination of the specimen surface relative to the optical axis of the lens optical path making adjustments to obtain a default value, preferably an angle of 90° to the optical axis.

For this purpose, the set-up is to be equipped with a specimen table relocatable in the coordinate directions X and Y vertical to the optical axis. This allows to focus three different points in the specimen surface not situated on a straight line. For each of these three points, the current focus position in the CCD line and the placement from the ideal focus position and/or the focus distance is determined.

The inclination of the specimen surface towards the optical axis of the lens optical path is calculated from the geometric combination of the placements and/or the inclination of the specimen surface is changed by tipping the specimen so that the placements between the current and ideal focus position or the focus distances for all three points are equal, and consequently, the specimen surface is aligned vertical to the optical axis of the lens optical path.

The control device. i.e. of the three-point linear adjustment type or the biaxial rotating adjustment type, is actuated according to the current inclination and an adjusting command to be generated from this until the undesired inclination is corrected.

The invention shall be explained hereinafter on the basis of some design examples. The related drawings show:

FIG. 1 the basic principle of a set-up for implementation of the process according to the invention, FIG. 2 a detail from FIG. 1 concerning the aperture set-up in the field stop plane, FIG. 3 the symbolic representation of a CCD line used as receiving device, FIG. 4 a resulting exemplary intensity curve cross the CCD line, FIG. 5 the curve of contrast values resulting according to the intensity curve from FIG. 4, FIG. 6 the equipment of the set-up according to the invention with an evaluation device and a positioning device for automatic focusing, FIG. 7 the typical intensity curve when imaging a glass/water interface onto the CCD line, FIG. 8 the curve of contrast values resulting according to the intensity curve from FIG. 7, FIG. 9 the design of the set-up according to the invention with inclined receiving device and inclined gap opening, FIG. 10 an option of the set-up according to the invention for precise determination of the focus position and tipping of the specimen plane relative to the reception surface in the receiving device, FIG. 11 a magnified representation of an aperture set-up from FIG. 10, FIG. 12 the outline of the contrast focuses in the pixel lines of a CCD matrix of the set-up according to FIG. 10, FIG. 13 an example of the connecting lines through the contrast focuses FIG. 1 shows an imaging optical system, i.e. a microscope set-up to be used for recording biochips. In biochip detection using microscopes, especially in fluorescence microscopy, finding the focus position is particularly difficult.

The microscope set-up according to FIG. 1 basically includes an illumination source 1 generating an illumination optical path with the optical axis 2 and a lens 3 imaging the illumination source 1 onto the surface of a specimen 4, the surface of a biochip in this case. The light reflected or also scattered by the specimen surface reaches a receiving device as imaging optical path having an optical axis 5, i.e. a CCD camera.

The specimen surface is imaged onto the reception surface of the receiving device 6 using an imaging optics consisting of the lens 3 and a field lens 7 and is then available for observation and evaluation.

The illumination optical path and imaging optical path are deflected or split up in the dividing surface 8 of a beam splitter 9.

According to the invention, an aperture set-up 11 is positioned in the aperture plane 10 of the illumination optical path displayed magnified in FIG. 2.

FIG. 2 reveals that the aperture set-up 11 shows i.e. a square aperture opening 12 defining the image area. Outside the aperture opening 12, however inside the illumination optical path marked by the circular limitation 13, the gap opening 14 of an aperture slot is positioned and superposed by a ruled grating 15.

When illuminating the specimen 4, the gap opening 14, superposed by the structure of the ruled grating 15, is imaged onto the surface of the specimen 4. The light in the imaging optical path reflected or scattered by the specimen 4, returns to the beam splitter 9 and is there, in the dividing surface 8, deflected towards the arriving illumination optical path passes a field lens 16, is output from the illumination optical path in the dividing surface 17 of another beam splitter 18 and directed at a CCD line 19.

The lens 3 and the field lens 16 act as an imaging optics imaging the gap opening 14 superposed by the lattice structure onto the CCD line 19. The CCD line 19 is inclined relative to the aperture set-up 11. Whereas the aperture set-up 11 including the gap opening 14 is aligned vertical to the optical axis 2 of the illumination optical path, the CCD line 19 forms an angle unequal 90° with the optical axis 33 of the detection optical path, preferably 45°.

FIG. 3 shows a symbolic representation of the CCD line 19 revealing that the CCD line 19 shows a multitude of in-line reception elements, hereinafter referred to as pixel 20. Each pixel 20 is assigned to a fixed position $x_i$ in the CCD line 19. If the CCD line 19 i.e. shows a number of 2.400 pixels 20, let us assume that at one end of the CCD line 19, the position $x_i=1$, at the opposite end of the CCD line 19 however, the position $x_i=2400$ is occupied by a pixel 20.

At the exit of each pixel 20, an intensity signal $I(x_i)$ is available, that is, each pixel 20 indicates the intensity of the imaging optical path in the assigned position $x_i$. As the gap opening 14 including the ruled grating 15 is imaged onto the beveled CCD line 19, there is exactly one position in the CCD line where the ruled grating 15 is imaged sharply. This position corresponding to the current focus position $P_f$ can be determined according to one or more assigned pixels 20.

The process according to the invention described hereinafter allows a more precise determination of the current focus position than according to the previous prior art.

According to the invention, an intensity value $I(x_i)$ of the radiation absorbed is determined for each position $x_i$ of a pixel 20. This gives an intensity curve across the CCD line 19 as represented in FIG. 4. FIG. 4 reveals that the intensity of imaging radiation in the range of the pixels $x_{700}$ to $x_{1200}$ is substantially higher than in the other ranges.

However, unlike in prior art, the position of maximum intensity is not sought after and defined as current focus position but the intensity values $I(x_i)$ are first processed to position-related contrast values. The position-related contrast values $I(y_i)$ are i.e. determined according to the function $$\forall i I(y_i) := |I(x_i) - I(x_{i+n})|$$

That is, the difference of the intensity value $I(x_i)$ of a position $x_i$ and an intensity value $I(x_i+n)$ of an adjacent position $x_{i+n}$ is computed in each case with n being variable and to be selected preferably between 1 and 20.

Each difference thus obtained is assigned as a contrast value $I(y_i)$ to a position $x_i$. This gives a curve of the contrast values $I(y_i)$ as represented in FIG. 5.

FIG. 5 reveals that the contrast values $I(y_i)$ in the range of $y_{600}$ to $y_{1100}$ are significantly greater than in the other ranges of the CCD line 19.

According to the invention, the contrast focus is determined in another step from the contrast values $I(y_i)$ according to the function $$P_f := \frac{\sum_i y_i \cdot I(y_i)}{\sum_i I(y_i)}$$

for all contrast values $I(y_i)$ greater than a default minimum value $I_{min}$. In the present case, $I_{min}$ was i.e. preset with an amount as represented in FIG. 5.

This contrast focus can be assigned to a location in the CCD line 19 approximately situated in the selected example in position $x_{850}$. This current focus position $P_f$ is now determined according to the invention.

In an advantageous definition of the process according to the invention, the current focus position $P_f$ in the CCD line 19 is, in a next step, compared to an ideal focus position $P_f''$ that has been determined from calibration of the microscope set-up, i.e. using a plain specimen surface, here assuming that its position is $y_{1200}$.

In the represented example according to FIG. 5, a distance of 350 pixels results between the positions $P_f$ and $P_f''$. The CCD line 19 shows a certain distance d between two pixels 20 respectively; from this, it can be derived that in this case, the current focus position $P_f$ is away from the ideal focus position $P_f''$ by approximately 350 times the distance d and that for obtaining a sharp image of the specimen surface onto the receiving device 6, the focus position is to be corrected.

This correction usually is effected by changing the distance $\Delta z$ between the specimen 4 and the lens 3.

In practice, the distances d between the different pixels in the CCD line used are determined by measurements for accuracy reasons, and the set-up is calibrated according to the result of measurement and is used for specimen evaluation in calibrated state.

To process the intensity values $I(x_i)$ in the afore-described way and also for automatic focusing, the microscope set-up is additionally equipped with an evaluation device 21 as represented in FIG. 6 and a positioning device 22 with the CCD line 19 connected with the evaluation device 21 and the evaluation device 21 connected with the positioning device 22 using signaling pathways.

The evaluation device 21 includes a difference former for determining the position-related contrast values $I(y_i)$ and a computation circuit for determining the contrast focus as equivalent of the current focus position $P_f$. The evaluation device 21 also is equipped with means for presetting a value n=1 ... 20 and a minimum value $I_{min}$.

In addition, a computation circuit is provided for in the evaluation device 21, according to the design example in FIG. 6, for determining the distance b between the current focus position $P_f$ and the location in the CCD line 19 corresponding to the ideal focus position $P_f''$. This computation circuit is also able to generate an adjusting command using the positioning device 22 for changing the distance $\Delta z$ between the specimen 4 and the lens 3 by an amount equivalent to the distance b in a preset direction R.

To displace the current focus position $P_f$ in the CCD line 19 towards R, an adjusting command is to be generated providing that the distance between lens 3 and specimen 4 is increased. Vice versa, this distance needs to be reduced using adjusting commands if the current focus position $P_f$ is to be displaced opposed towards R. When the current focus position $P_f$ is overlapping with the ideal focus position $P_f''$ after executing the adjusting commands, automatic focusing is completed.

In a special process option according to claim 4 meeting the higher requirement for precision of automatic focusing, it is intended that the evaluation device 21, in consideration of all contrast values $I(y_i)$ greater than a default minimum value $I_{min}$, will first determine a location $P_f'$ in the CCD line 19 and only then, in a following step, determine the current focus position $P_f$, in consideration of all contrast values $I(y_i)$ greater than the default minimum value $I_{min}$ not being farther from the location $P_f'$ than by a default distance a.

This two-stage process avoids the influence of focusing disorders by determining a corrected contrast focus which is taken as a basis for determining the current focus position $P_f$.

To determine the focus position relative to an interface on or in the specimen belonging to a layer system with several interfaces, measures can be taken to increase the contrast for the maxima and minima represented in FIG. 4. This is i.e. obtained by adjusting the lattice gap length.

This allows to change the maximum length according to the lattice gap. Selecting a very narrow lattice gap also involves a narrow intensity distribution. This produces "confocal" conditions, and the light reflected by other interfaces does not reach the CCD line 19. In this way, the contrast of the lattice bands imaged onto the CCD line 19 can be increased so that glass/water interfaces with a distinctive lower reflection close to glass/air interfaces can be focused precisely also allowing a precise measurement of their distance to each other.

In this regard, FIG. 7 shows the intensity curve when imaging a glass/water interface to the CCD line 19. The disorders which can be detected in the range of $x_{500}$ to $x_{1100}$ are due to adjacent scattering interfaces with a distance of approx. 150 µm to each other.

Further processing of the intensity values $I(x_i)$ represented in FIG. 7 in the described way leads to position-related contrast values $I(y_i)$ as represented in FIG. 8.

In the designs of the set-up according to the invention previously exposed, both the aperture 12 and the gap opening 14, as components of the aperture set-up, are aligned vertical to the optical axis 2 of the illumination optical path. This results in excellent results of measurement when evaluating specimen 4 whose surface is scattered to a minor degree only.

FIG. 9, however, represents a set-up according to the invention in a design suitable in particular for examining specimen 4 with relatively high-scattering surfaces.

As in the design examples previously exposed, also according to the design in FIG. 9, the aperture set-up 11 positioned in the field stop plane 10 shows a gap opening 14 and an aperture 12. Also here, the gap opening 14 is used to determine the focus position and the aperture 12 for defining the perimeter and size of an image detail in specimen 4.

The aperture 12 is aligned approximately centrical to the optical axis 2 of the illumination optical path and the gap opening 14 is situated in the periphery of the illumination optical path.

As an exception, the gap opening 14 here includes an angle with the optical axis 2 whose amount equals the amount by which the CCD line 19 is inclined against the optical axis 33 of the detection optical path whereas the aperture 12 is still aligned vertical to the optical axis 2 of the illumination optical path.

In addition, the optical path between the specimen 4 and the gap opening 14 is as long as the optical path between the specimen 4 and the CCD line 19.

Such an aperture set-up 11 can i.e. be realized technically by separately manufacturing an aperture part 11.1 with the gap opening 14 and an aperture part 11.2 with the apertures 12 which are connected afterwards.

The requirement of equal optical path lengths between the gap opening 14 and the specimen 4 on the one hand and the specimen 4 and the CCD line 19 on the other hand is met in the represented case when the intersection point at which optical axis 2, optical axis 33 and dividing surface 17 of the beam splitter 18 meet, have the same distance to the intersection point of the optical axis 2 with the gap opening 14 as the intersection point of the optical axis 33 with the CCD line 19.

A set-up for executing another option of the process according to the invention is represented in FIG. 10. This set-up is suitable for applications that also require, besides the precise determination of the focus position, the tipping of the specimen plane relative to the reception surface of the receiving device 6.

For the purpose of clarity, the same reference numerals for the same components, if possible, are used as in FIG. 1.

The difference between the set-up according to FIG. 10 and the set-up according to FIG. 1 is that a second illumination source 23 is provided for to originate a second illumination optical path 24 directed towards the specimen 4. The illumination optical path 24 is deflected in the dividing layer 25 of an additional beam splitter 26 towards the specimen 4 and merged in the beam splitter 9 with the optical axis 2 of the illumination optical path originated from the illumination source 1.

There is an aperture set-up 28 in the field stop plane 27 represented magnified in FIG. 11. The aperture set-up 28 consists of two half apertures 28.1 and 28.2 both set up next to each other in the illumination optical path 24 to completely fill the image area intended for imaging onto the specimen 4.

The illumination sources 1 and 23 are operated alternatively, that is, the illumination source 1 is used for imaging the specimen surface onto the CCD camera of the receiving device 6 for observation and evaluation purposes whereas the illumination source 23 is used only for determining the current focus position and the tipping angle of specimen 4 against the reception surface of the receiving device 6.

Each of the two half apertures 28.1 and 28.2 consists of a number of gap openings 29 and 30 running parallel to each other, with each of them including the gap opening 14, being superposed by a lattice structure in the set-up according to the FIG. 1. The gap openings 29 of the half aperture 28.1 are aligned vertical to the gap openings 30 of the half aperture 28.2.

The lattice structures are aligned vertical to the gap openings 29 and 30 respectively, that is, the lattice vectors run parallel to the respective gap opening 29 or 30.

A beveled CCD line 19, as in the set-up according to FIG. 1, is not required here. The aperture set-up 28 is imaged onto a CCD matrix in the receiving device 6 after the imaging light coming from the specimen 4 has passed the lens 3, the beam splitter 9, the field lens 7 and the beam splitter 26.

FIG. 12 shows a symbolic representation of the CCD matrix with the pixel lines 31 and 32 required by the image of the gap openings 29 and 30.

Each of the gap openings 29 including the lattice structure in the pixel line 31 is imaged onto the CCD matrix causing intensity signals $I(x_i)$ available at the signal output of each pixel. This also applies to the gap openings 30 imaged onto one pixel line 32 respectively in the CCD matrix including the lattice structure.

AS already described further above for an individual CCD line 19 according to FIG. 1, also in this process option, the intensity values $I(x_i)$ determined are combined to position-related contrast values $I(y_i)$. In exactly the way described above, a contrast focus indicating the current focus position $P_f$ respectively can be determined.

The contrast focuses can be connected by straight lines for each imaged half aperture 28.1 or 28.2. The two straight lines are defined by the corresponding straight line equations $y_1=m_1*x_1+n_1$ and. $y_2=m_2*x_2+n_2$.

The variables $n_1$ and $n_2$ make a measure for the current focus position in calibrated state. If $n_1$ and $n_2$ correspond to a default distance value, the imaging optics is focused.

In addition, based on the mathematic relations from the variable $m_1$ describing the gradient of the straight line $y_1=m_1*x_1+n_1$ and consequently the deviation from the parallel alignment towards the pixel lines 31 and 32, the first tipping angle and the second tipping angle from $m_2$ of the focus plane are determined related to the plane of specimen 4.

It is assumed that, in calibrated state of the set-up, the variables $m_1$ and $m_2$ are proportional to a tipping angle of the focus plane related to the plane of the specimen 4.

When tipping the plane of specimen 4 intentionally until the two variables $m_1$ and $m_2$ correspond to a setpoint value, preferably the value "zero", tipping is corrected.

REFERENCE NUMERAL LIST

1 source of illumination
2 optical axis of the illumination optical path
3 lens
4 specimen
5 optical axis of the imaging optical path
6 receiving device
7 field lens
8 dividing surface
9 beam splitter
10 field stop plane
11 aperture set-up
12 aperture
13 limitation
14 gap opening
15 ruled grating
16 field lens
17 dividing surface
18 beam splitter
19 CCD line
20 pixel
21 evaluation device
22 positioning device
23 illumination source
24 illumination optical path dividing surface
26 beam splitter
27 aperture plane
28 aperture set-up
28.1, 28.2 half apertures
29, 30 gap openings
31, 32 pixel lines
33 optical axis of a detection optical path

The invention claimed is:

1. A method for determining a focus position when imaging a specimen, the method comprising:
   imaging a field stop onto the specimen;
   imaging an optical grid at least partially superimposed on the imaged field stop;
   measuring intensity values $I(x_i)$ for light reflected by the specimen using a position-sensitive receiving device inclined relative to the field stop, each intensity value $I(x_i)$ being assigned to a position in the receiving device;
   determining position-related contrast values from the intensity values $I(x_i)$; and
   determining a position of a contrast focus in the receiving device relative to a current focus position.

2. The method according to claim 1 wherein determining position-related contrast values $I(y_i)$ is performed according to the function $$\forall_i I(y_i) := |I(x_i) - I(x_{i+n})|$$

from the respective difference of the intensity value $I(x_i)$ assigned to a position i in the receiving device and an intensity value $I(x_{i+n})$ assigned to an adjacent position i+n, with n=1 ... 20.

3. The method according to claim 2 further comprising determining a location relative to a current focus position $P_f$ according to the function $$P_f := \frac{\sum_i y_i \cdot I(y_i)}{\sum_i I(y_i)}$$

for all contrast values $I(y_i)$ greater than a default minimum value $I_{min}$.

4. The method according to claim 2 further comprising determining a location $P_f'$ according to the function $$P_f := \frac{\sum_i y_i \cdot I(y_i)}{\sum_i I(y_i)}$$

for all contrast values $I(y_i)$ greater than a default minimum value $I_{min}$ and
determining a location relative to a current focus position according to the function $$P_f' := \frac{\sum_i y_i \cdot I(y_i)}{\sum_i I(y_i)}$$

for all contrast values $I(y_i)$ greater than a default minimum value $I'_{min}$ not being farther from the location $P_f'$ than by a default distance a.

5. The method according to claim 1, wherein:
   the field stop comprises a gap opening;
   the optical grid comprises a ruled grating in the form of a band-shaped mask;
   the receiving device comprises a CCD line; and
   wherein the receiving device has positions i representing consecutively numbered pixels of the CCD line; and
   wherein the distance a between a number of pixels is preset in the range of about a=10 ... 1000.

6. The method according to claim 1, further comprising: generating an input signal for automatic focusing from a distance b measured in the receiving device and between the location $P_f$ and a location $P_f''$ corresponding to an ideal focus position in the receiving device, by changing the distance $\Delta z$ between the specimen and imaging optics.

7. The method according to claim 1, further comprising:
using a rectangular aperture as the field stop;
a CCD matrix as the receiving device; and
the optical grid comprising two lattice masks each having a lattice plane, the lattice planes being inclined relative to each other with each of the lattice masks comprising several band-shaped masks that are positioned substantially parallel to each other;
generating an image onto the specimen of each of the band-shaped masks and determining the position of the contrast focus for each mask imaged relative to a current focus position in the CCD matrix;
determining the position and slope of two lines connected through the contrast focuses; and
determining the tipping angle of a focus plane relative to a reception surface of the CCD matrix.

8. The method according to claim 7, further comprising deriving an input signal from the tipping angle of the focus plane relative to the plane of the reception surface for compensation of the tipping angle.

9. The method according claim 1, further comprising preselecting a gap length of the optical grid according to reflectivity of a selected portion of the specimen and/or the intensity of interfering scattered or reflected light.

10. The method according claim 9, further comprising preselecting the gap length to be a smaller value when a portion of the specimen demonstrates a lower reflectivity or when scattered or reflected background light is more intense.

11. The method according to claim 5, further comprising:
averaging the intensity values of adjacent pixels of the receiving device over a period of the imaged grid;
determining the deviation of an actual value of an intensity signal obtained $I_{ist}$) from a default set point value of an intensity signal $I_{soll}$; and
correcting contrast values $I(y_i)$ that vary due to particulates in the optical path or other disruptions to compensate for deviation.

12. The method according to claim 11, wherein the averaging the intensity values of adjacent pixels is performed according to the function $$I(x_i) := \frac{1}{n}\sum_{j=0}^{n} J\left(x_{i+j-\frac{n}{2}}\right)$$

for all $x_i$ with n=2 . . . 100 with n corresponding to the number of pixels per lattice period.

* * * * *

UNITED STATES PATENT AND TRADEMARK OFFICE
CERTIFICATE OF CORRECTION

PATENT NO. : 7,488,924 B2 Page 1 of 12
APPLICATION NO. : 10/554899
DATED : February 10, 2009
INVENTOR(S) : Daniel Bublitz, Dieter Graefe and Peter Westphal It is certified that error appears in the above-identified patent and that said Letters Patent is hereby corrected as shown below:

Title Page, Item (54) and at Column 1, lines 1-4, Title should read:

METHOD AND ARRAY FOR DETERMINING THE FOCAL POSITION DURING IMAGING OF A SAMPLE

Title Page, Item (57) delete Abstract and substitute with the following:

~~Summary~~ Abstract of the Disclosure

~~The invention refers to a~~ A process for determining the focus position when imaging a specimen with a field stop imaged onto the specimen detecting this image using a position-sensitive receiving-device inclined relative to the field stop defining the focus position by means of intensity distribution in the receiving device. The invention also ~~refers to set-ups as regards~~ includes arrangements for implementation of the process according to the invention.
   According to the invention, in a process of the above-mentioned type, imaging of the field stop onto the specimen~~(4)~~ is at least partially superposed by an optical lattice; the position-sensitive receiving device is used to determine intensity values for the light reflected by the specimen; these intensity values are assigned to positions in the receiving device; position-related contrast values are determined from the position-related intensity values; the position of the contrast focus in the receiving device as equivalent of the current focus position is determined using these contrast values.

~~Fig. 1~~

Signed and Sealed this

Twenty-third Day of November, 2010

David J. Kappos
*Director of the United States Patent and Trademark Office*

Delete Column 1, line 6 - Column 11, line 23 and substitute therefore the following:

Field of the Invention

The invention refers to a process for determining the focus position when imaging a specimen [[(4)]] with a field stop imaged onto the specimen; detecting this image using a position-sensitive receiving-device inclined relative to the field stop; and defining the focus position by means of intensity distribution in the receiving device. The invention also refers to set-ups as regards implementation of the process according to the invention.

Background of the Invention

Precise images of a specimen or a piece of specimen using imaging optics requires [[to put]] placing the specimen exactly in the focus position of the imaging optics. ~~In case~~ When the image is out of focus, it is important to [[learn]] determine by what value and in what direction the position of the specimen is to be changed relative to the imaging optics and to derive respective adjusting commands, if applicable, which can be used for focusing.

In this context, triangulation processes, imaging processes with contrast evaluation and the position fix using beveled confocal aperture slot are substantially known.

In the triangulation processes, a collimated laser beam is reflected into the pupil plane of an imaging lens and the Z position of the laser light reflected by the specimen is derived from the course of this laser beam relative to the imaging optical path.

An essential disadvantage of this process is that image distortions are produced due to imaging the laser light in planes of the specimen differing in depth causing the signal detected to vary ~~heavily~~ significantly over a given depth of ~~sharpness~~ focus range.

The accuracy when determining the focus position unfortunately depends on whether the result of measurement is determined in the center or the periphery of the capture range of a detector. To compensate for this effect, the focus position is ~~to be~~ generally determined in several iterative steps causing this process to be relatively time-consuming.

In imaging processes ~~with~~ utilizing contrast evaluation, the specimen is illuminated according to a latticed intensity distribution by positioning a lattice in the field stop plane of the illumination optical path. The specimen illuminated ~~that~~ in this way is imaged onto a receiving device. In this way, a series of images with different distances between the imaging optics [[is]] and the specimen is recorded selecting the image with the highest contrast from this series. The distance between the imaging optics and the specimen assigned to this image is classified as optimal focus distance.

[[The]] A disadvantage of this system is that for recording the images series, many different z positions ~~are to be approached~~ must be utilized and measured with high precision causing this process to be relatively time-consuming.

In ~~a position fix~~ measuring focal distance using beveled confocal aperture slots, an aperture slot is positioned in the field stop plane of the illumination optical path and imaged onto the specimen. The light reflected by the specimen is directed at a CCD line ~~assigned~~ inclined relative to the aperture slot to determining the position of the CCD line where the reflected light is maximum. ~~As in this process, the~~ The focus position can be calculated using a single image onto the line, the result of focus calculation is available within a relatively short time.

However, there are disadvantages. ~~insofar as fluctuations.~~ Fluctuations in intensity may result from impurities in the specimen or ~~disturbing~~ structures in the specimen surface possibly leading to faulty results of measurement. The main ~~problem~~ limitations of this process are the ~~mayor~~ major adjustments needed when imaging the gap onto the CCD line as the gap (and the line) [[is]]need to be very narrow to obtain high precision. ~~Perfectly corrected~~ Highly precise imaging optics also are required.

During chip manufacture in particular, ~~structures~~ increasingly fine and thin structures are desired ~~aimed at~~. This results in increasingly high requirements for the inspection processes used to verify [[the]] manufacturing accuracy. Accordingly, increasingly quick and precise focusing, preferably without the need to interrupt[[ing]] the manufacturing sequence, is called for.

Based upon this, ~~the underlying tasks of this invention is~~ it would be desirable to further increase accuracy when determining the focus position and also to ~~indicate set-ups~~ have apparatus allowing the implementation of ~~such~~ a more precise process.

Summary of the Invention

The present invention ~~can be assigned to the subject group of position fix using~~ utilizes beveled confocal aperture slots to accurately fix a position of the specimen.

According to the invention, in a process of the above-mentioned type the invention includes imaging a field stop onto the specimen and with [[a]] an image at least partially superposed by an optical lattice using a position-sensitive receiving device inclined relative to the field stop[[,]] determining intensity values for the light reflected by the specimen ~~are determined~~. These intensity values are assigned to positions in the receiving device. Position-related contrast values are determined from the position-related intensity values and the position of the contrast focus in the receiving device as ~~equivalent of~~ related to the current focus position is determined using these contrast values.

Unlike ~~the relevant~~ processes according to prior art, the focus position is not determined ~~as equivalent of~~ by finding the intensity maximum in the receiving device but the superposing of the aperture imaging in the specimen with imaging of an optical lattice allows [[to]] the determination of ~~determine~~ position-related contrast values using them as a base for determining the current focus position.

Compared to the other process_es_ previously known, this offers the essential advantage of significantly reduced adjustment needs. Also the results when determining the focus position are no longer that much distorted by ~~underground~~ background light, impurities in the specimen or disturbing specimen structures. In this respect, the invention provides a quick process ensuring a significantly higher precision compared to the prior art.

A preferred design option of the process according to the invention provides for determining position-related contrast values $I(y_i)$ according to the function $$\forall i \quad I(y_i) := |I(x_i) - I(x_{i+n})|$$

Where $I(x_i)$ ~~stands for~~ represents intensity values assigned to a position $x_i$ in the receiving device whereas $I(x_{i+n})$ stands for intensity values assigned to an adjacent position $x_{i+n}$ preferably selecting n in the range of 1...20.

After determining the position-related contrast values, a location is determined ~~as equivalent of~~ relative to the current focus position $P_f$ according to the function $$P_f := \frac{\sum_i y_i \cdot I(y_i)}{\sum_i I(y_i)}$$

All contrast values greater than a default minimum value $I_{min}$ are included here.

~~Through this~~Thus, high precision and reduced adjustment needs compared to the prior art can ~~already~~ readily be achieved in many applications.

For even higher precision requirements, a location $P_f'$ is determined in a first step according to the function $$P_f := \frac{\sum_i y_i \cdot I(y_i)}{\sum_i I(y_i)}$$

for all contrast values $I(y_i)$ greater than a default minimum value $I_{min}$. Subsequently, a location is determined in a second step ~~as equivalent of~~ as a function of the current focus position $P_f$ according to the function $$P_f' := \frac{\sum_i y_i \cdot I(y_i)}{\sum_i I(y_i)}$$

for all contrast values $I(y_i)$ greater than a minimum value $I'_{min}$ not being farther away from the location $P_f'$ than [[by]] a default distance a.

The minimum values $I_{min}$ and $I'_{min}$ fixed for the first and second step respectively can be equal or unequal.

Preferably, a field stop is used as the aperture slot, an absorption lattice is used as the optical lattice in the form of a band-shaped mask and a CCD line as receiving device. In this case, the positions $x_i$ are characterized by the consecutive numbering of the sensor elements in the CCD line, hereinafter referred to as pixels. ~~In case~~ For example, if the CCD line [[i.e.]] has 2.400 pixels, their positions are defined using $x_1$ to $x_{2400}$. The distance a between two pixels in the CCD line is then indicated with a number of pixels with default values [[for a]] preferably in the range of 10 to 1000.

In ~~a more advanced~~ another ~~design~~ embodiment that can be used for automatic manufacturing control in particular, an input signal for automatic focusing is generated from the distance b between a location in the receiving device corresponding to the ideal focus position $P_f''$ ~~in the receiving device~~ measured in the receiving device and the location corresponding to the current focus position $P_f$.

The input signal is preferably used for changing the distance $\Delta z$ between the specimen and the imaging optics until the locations $P_f$ imaged onto the CCD line align with the location $P_f''$ preset according to an instrument calibration.

Such control devices are known from the prior art and do not require any further explanation at this point. In particular, step motors coupled to a specimen table have proved themselves suitable for driving such control devices.

Another embodiment of the invention ~~design~~ is not only suitable for determining the current focus position but also for defining a tipping in the focus plane related to the reception surface of a detector in the receiving device.

In this ~~regard, it is intended to use a~~ embodiment, the aperture is a rectangle aperture ~~as aperture~~ and the receiving device is a CCD matrix ~~as receiving device~~ and [[a]] the optical lattice ~~consisting of~~ includes two lattice masks inclined against each other in the lattice plane with each of them showing several band-shaped masks running parallel to each other. ~~It is intended to~~ An image is ~~generate~~ projected ~~an image~~ onto the specimen of each of the band-shaped masks and the CCD matrix is used to determine the position of the contrast focus for each mask imaged ~~using the CCD matrix~~ according to the technique described further above ~~and in the claims 2 to 4 equally~~.

In this case, the positions of the contrast focus on each mask imaged are the equivalent of a current focus position. According to the invention, the ~~course~~ direction and inclination of the two connecting lines are determined by the contrast focuses and, as a result, by the tipping angle of the focus plane related to the reception surface of the CCD matrix as described in more detail further below.

Here also it is ~~quite conceivable~~ also possible to receive an input signal from the tipping angle of the focus plane determined related to the reception surface plane of the CCD matrix which can be used for compensation of the tipping angle using a control device for influencing the specimen inclination relative to the optical axis of the imaging optical path.

In each of the afore-mentioned ~~design option~~ embodiments of the invention, the gap length of the optical lattices are preset according to the reflection capacity of a selected piece of specimen and/or the intensity of scattered or reflected, and consequently, ~~disturbing~~ interfering light. To increase accuracy when determining the contrast focus, the gap length should be preset ~~the~~ to a smaller size, when the specimen has ~~the~~ lower ~~the~~ reflection capacity ~~of the piece of specimen is~~ or ~~the more intense~~ or when the ~~disturbing~~ interfering scattered or reflected light is of greater intensity.

Also it may prove advantageous, for further processing of the intensity values, to first average the intensity values of adjacent pixels over a period of the lattice imaged and to then determine the deviations of the intensity signal $I_{ist}$ (actual value) received from a default intensity signal $I_{soll}$ (setpoint value) and eventually to correct the contrast values according to the difference resulting.

The advantage is that first, only one intensity value, namely the averaged intensity signal $I_{ist}$, is to be determined. Taking as a basis the deviation of this intensity signal $I_{ist}$ from an intensity signal $I_{soll}$ to be expected, the contrast values are corrected so that ~~failures~~ errors due to dirt particles in the optical path or a specimen irregularly reflecting are compensated.

The intensity values of adjacent pixels can be averaged according to the function $$I(x_i) := \frac{1}{n} \sum_{j=0}^{n} J(x_{i+j-\frac{n}{2}})$$

for all $x_i$ with n = 2 ... 100 with n preferably corresponding to the number of pixels per grating period.

The invention also ~~refers to a set up~~ includes an arrangement for implementing the process steps described so far, which may be a microscope ~~se-up~~ in particular, including: a light source for generating an illumination beam ~~optical path~~, ~~an~~ imaging optics used for directing the illumination ~~optical path~~ beam path at the specimen and a camera set up in the imaging optical path with

- a gap opening superposed by a lattice mask positioned in the illumination optical path,
- a detection optical path deflected from the imaging optical path directed at a CCD line,
- a CCD line ~~including~~ being positioned at an angle of $\alpha \neq 90°$ with the optical axis of the detection optical path,
- a CCD line connected with an evaluation device for determining position-related intensity values $I(x_i)$ and position-related contrast values $I(y_i)$ and
- the evaluation device for determining the position of the contrast focus in the CCD line as an equivalent of the current focus position.

~~An advantage is~~ It is advantageous to associate the gap opening with an aperture defining the perimeter and size of an image detail in the specimen, positioned in the field stop plane with the aperture aligned ~~centrical~~ centrally to the illumination optical path and the gap opening in the periphery of the illumination optical path.

In ~~a design option of the set up~~ an embodiment according to the invention, suitable in particular for observing and examining specimens with highly scattering surfaces, the aperture should be ~~aligned vertical~~ substantially perpendicular to the optical axis whereas the gap opening ~~includes~~ positioned at an angle with the optical axis corresponding to the angle by which the CCD line is inclined against the optical axis of the detection optical path with the optical path length between the specimen and the gap opening equaling the optical path length between the specimen and the CCD line.

The evaluation device can i.e. include a difference ~~former~~ generator determining position-related contrast values $I(y_i)$ according to the function $$\forall i \quad I(y_i) := |I(x_i) - I(x_{i+n})|$$

with the intensity values $I(x_i)$ and $I(x_{i+n})$ respectively assigned to the positions $x_i$ and $x_{i+n}$ and the evaluation device also equipped with a computation circuit determining the contrast focus as ~~equivalent~~ a function of the current focus position n according to the function $$P_f := \frac{\sum_i y_i \cdot I(y_i)}{\sum_i I(y_i)}$$

for all contrast values $I(y_i)$ greater than a default minimum value $I_{min}$.

In the CCD line, the value n defines the distance ~~of~~ between adjacent positions ~~to each other~~. In this respect, n is variable and is preset according to the application with n = 1...20.

Particularly for applications related to devices for automatic biochip manufacture whose control of finishing accuracy also is automated, a computation circuit is provided for in the evaluation device used for determining the distance b between ~~the location corresponding to~~ the current focus position $P_f$ in the CCD line and ~~a location corresponding to~~ the ideal focus position $P_f$" in the CCD line. This provides a measure for deviation from the ideal focus position.

Hence it is also advantageous if the configuration of the evaluation device allows determination of an input signal from deviation from the ideal focus position and is connected to a control device for correcting the focus position, i.e. by changing the distance $\Delta z$ between the specimen and the imaging optics. This is to control the distance between the current focus position and the ideal focus position making adjustments until the distance b ~~tends to 0~~ approaches zero which represents ~~so representing~~ the ideal focus position.

To obtain optimal results when determining the current focus position and placement, it is advantageous to adapt the frequency of the lattice respectively used for imaging onto the specimen from the ideal focus position to the optical resolution limit of the imaging optics. Preferably, five pixels of the CCD line in each case should correspond to one grating period.

When imaging plain specimen surfaces, the process according to the invention and the set-up previously described can also be used for leveling purposes. This can be done by determining the inclination of the specimen surface relative to the optical axis of the lens optical path. The inclination is then adjusted ~~making adjustments~~ to obtain a default value, which preferably has an angle of 90° to the ~~optical~~ principal axis.

For this purpose, the set-up is to be equipped with a specimen table relocatable in the coordinate directions X and Y vertical to the optical axis. This allows [[to]] focusing three different points in the specimen surface not situated on a straight line. For each of these three points, the current focus position in the CCD line and the placement from the ideal focus position and/or the focus distance is determined.

The inclination of the specimen surface ~~towards~~ relative to the optical axis of the lens optical path is calculated from the geometric combination of the placements and/or the inclination of the specimen surface is changed by tipping the specimen so that the placements between the current and ideal focus position or the focus distances for all three points are equal, and consequently, the specimen surface is aligned ~~vertical~~ perpendicular to the optical axis of the lens optical path.

The control device, i.e. of the three-point linear adjustment type or the biaxial rotating adjustment type, is actuated according to the current inclination and an adjusting command to be generated from this until the undesired inclination is corrected.

Brief Description of the Drawings

The invention shall be explained hereinafter on the basis of some ~~design~~ example[[s]]example embodiments. The related drawings show.

Detailed Description of the Invention

Figure 1:
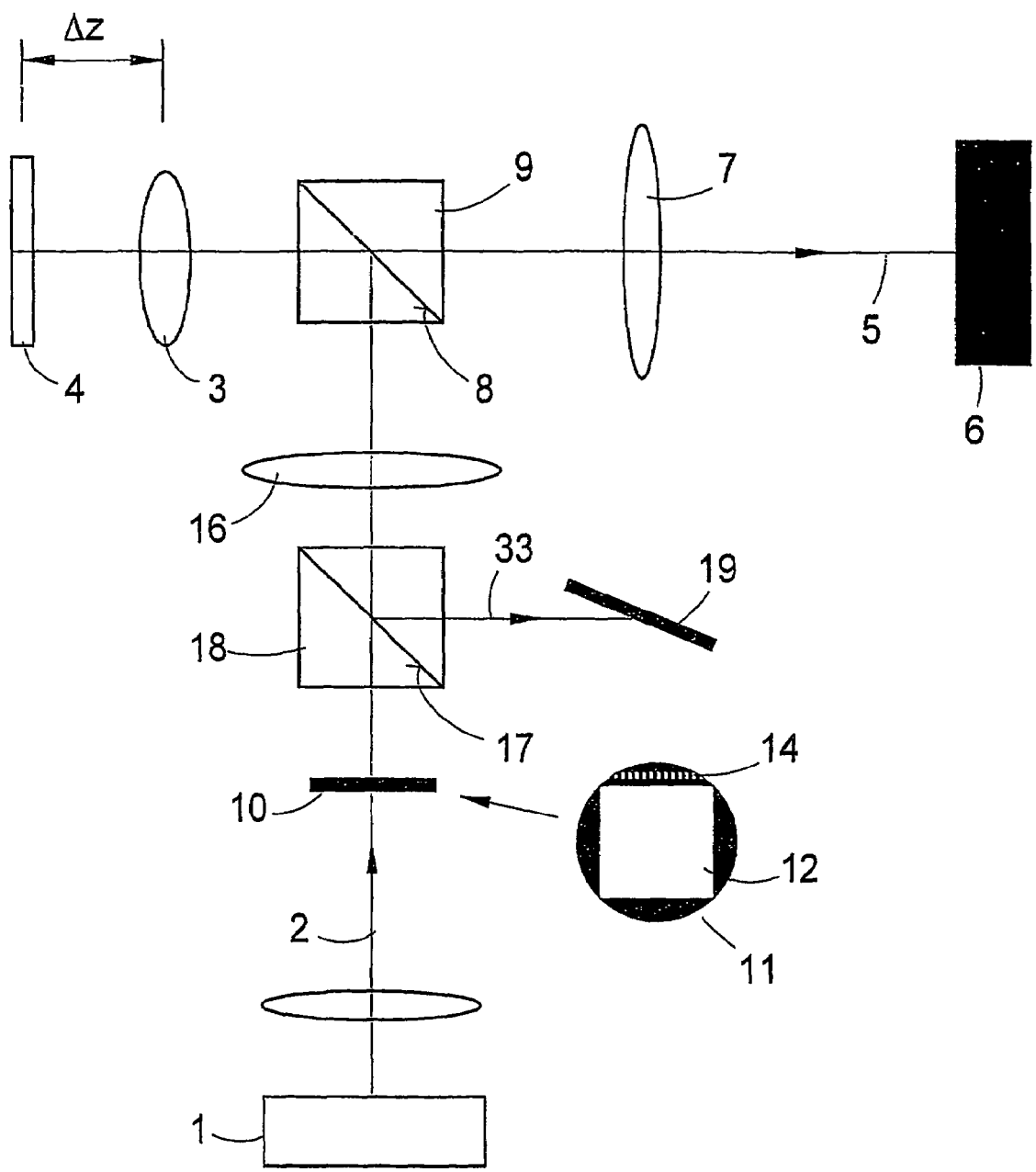
Fig. 1 is a schematic depiction the basic principle of ~~a set-up~~ an arrangement for implementation of the process according to the invention.

Fig. 1 shows an imaging optical system, i.e. a microscope set-up to be used for recording biochips. In biochip detection using microscopes, especially in fluorescence microscopy, finding the focus position is particularly difficult.

The microscope set-up according to fig. 1 ~~basically~~ generally includes an illumination source 1 generating an illumination optical path with the optical axis 2 and a lens 3 imaging the illumination source 1 onto the surface of a specimen 4, in this case the surface of a biochip ~~in this case~~. The light reflected or ~~also~~ scattered by the specimen surface reaches a receiving device ~~as~~ via an imaging optical path having an optical axis 5, i.e. a CCD camera.

The specimen surface is imaged onto the reception surface of the receiving device 6 using ~~an~~ imaging optics consisting of the lens 3 and a field lens 7 and is then available for observation and evaluation.

The illumination optical path and imaging optical path are deflected or split up ~~in~~ at the dividing surface 8 of a beam splitter 9.

Figure 2:
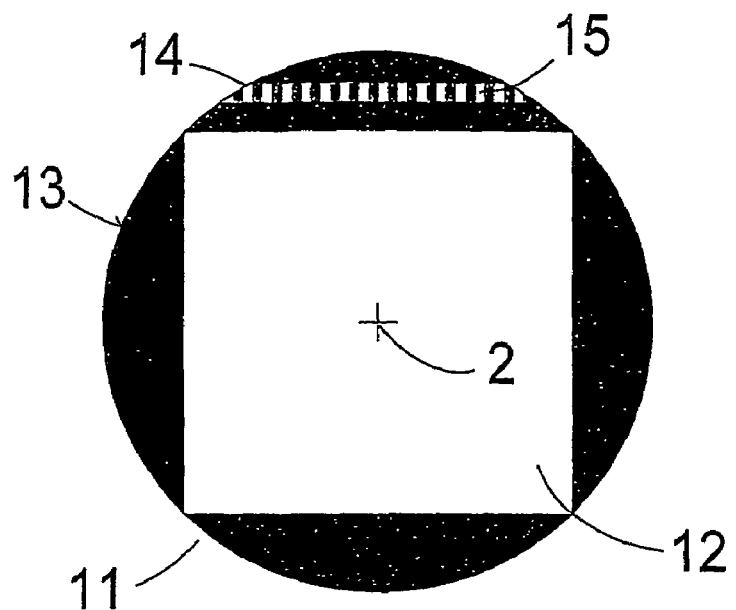
Fig. 2 is a detail from fig. 1 concerning the aperture set-up in the field stop plane, Fig. 3 ~~the symbolic~~ is a schematic representation of a CCD line used as receiving device.

According to the invention, an aperture set-up 11 is positioned in the aperture plane 10 of the illumination optical path displayed magnified in fig. 2.

Fig. 2 reveals that the aperture set-up 11 includes ~~shows~~ i.e. a square aperture opening 12 defining the image area. Outside the aperture opening 12, ~~however~~ but inside the illumination optical path marked by the circular limitation 13, the gap opening 14 of an aperture slot is positioned and superposed by a ruled grating 15.

When illuminating the specimen 4, the gap opening 14, superposed by the structure of the ruled grating 15, is imaged onto the surface of the specimen 4. The light in the imaging optical path reflected or scattered by the specimen 4, returns to the beam splitter 9 and is there, in the dividing surface 8, deflected towards the arriving illumination optical path, passes a field lens 16, is output from the illumination optical path in the dividing surface 17 of another beam splitter 18 and directed at a CCD line 19.

The lens 3 and the field lens 16 act as ~~an~~ imaging optics imaging the gap opening 14 superposed by the ~~lattice~~ grid structure onto the CCD line 19. The CCD line 19 is inclined relative to the aperture set-up 11. Whereas the aperture set-up 11 including the gap opening 14 is aligned ~~vertical~~ normal to the optical axis 2 of the illumination optical path, the CCD line 19 forms an angle unequal 90° with the optical axis 33 of the detection optical path, preferably 45°.

Figure 3:
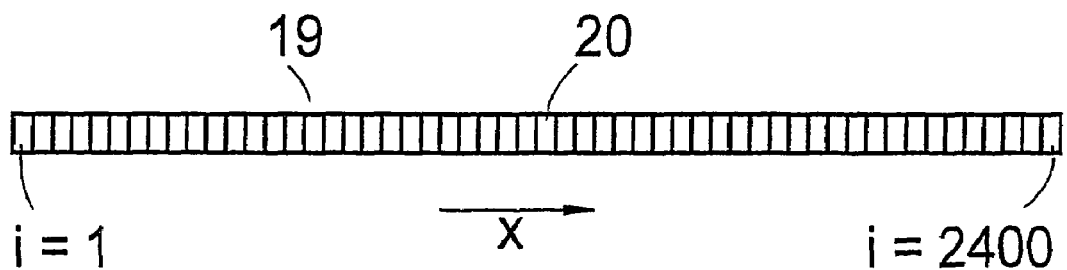

Fig. 3 shows a symbolic representation of the CCD line 19 revealing that the CCD line 19 ~~shows~~ includes a multitude of in-line reception elements, hereinafter referred to as pixels 20. Each pixel 20 is assigned to a fixed position $x_i$ in the CCD line 19. If the CCD line 19 i.e. shows a number of 2.400 pixels 20, let us assume that at one end of the CCD line 19, the position $x_i=1$, at the opposite end of the CCD line 19 however, the position $x_i=2400$ is occupied by a pixel 20.

~~At the exit of each~~ Each pixel 20[[,]] outputs an intensity signal $I(x_i)$ ~~is available,~~ that is, each pixel 20 indicates the intensity of the imaging optical path in the assigned position $x_i$. As the gap opening 14 including the ruled grating 15 is imaged onto the ~~beveled~~ angled CCD line 19, there is exactly one position in the CCD line where the ruled grating 15 is imaged sharply. This position corresponding to the current focus position $P_f$ can be determined according to one or more assigned pixels 20.

The process, according to the invention described hereinafter, allows a more precise determination of the current focus position than ~~according to~~ the ~~previous~~ prior art.

Figure 4:
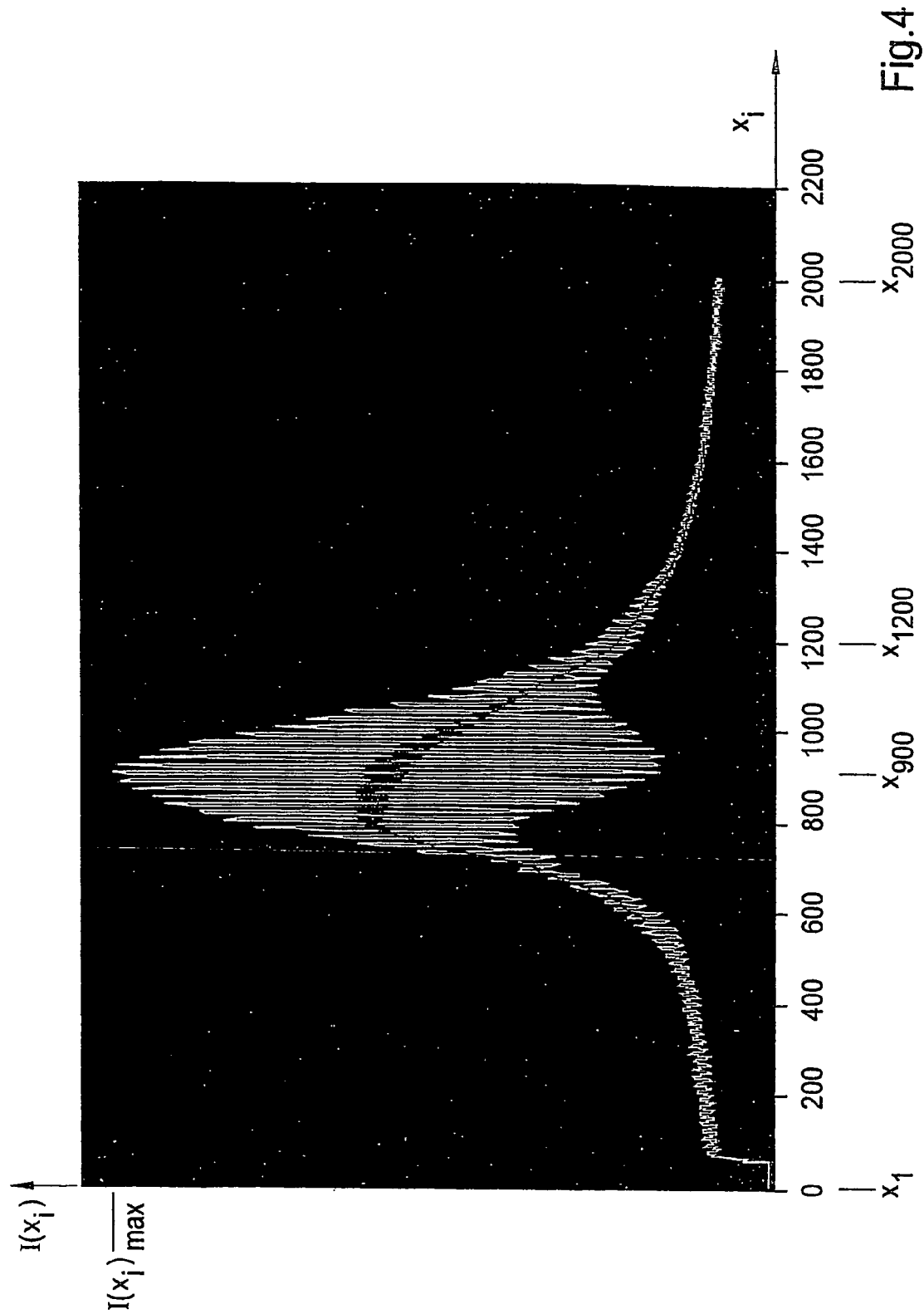
Fig. 4 is a resulting exemplary intensity curve cross the CCD line.

According to the invention, an intensity value $I(x_i)$ of the radiation absorbed is determined for each position $x_i$ of a pixel 20. This gives an intensity curve across the CCD line 19 as represented in fig. 4. Fig. 4 reveals that the intensity of imaging radiation in the range of the pixels $x_{700}$ to $x_{1200}$ is substantially higher than in the other ranges.

However, unlike in prior art, the position of maximum intensity is not sought after and defined as current focus position but the intensity values $I(x_i)$ are first processed to position-related contrast values. The position-related contrast values $I(y_i)$ are i.e. determined according to the function $$\forall i \quad I(y_i) := |I(x_i) - I(x_{i+n})|.$$

That is, the difference of the intensity value $I(x_i)$ of a position $x_i$ and an intensity value $I(x_i+n)$ of an adjacent position $x_{i+n}$ is computed in each case with n being variable and to be selected preferably from a range between 1 and 20.

Each difference thus obtained is assigned as a contrast value $I(y_i)$ to a position $x_i$. This gives a curve of the contrast values $I(y_i)$ as represented in fig. 5.

Figure 5:
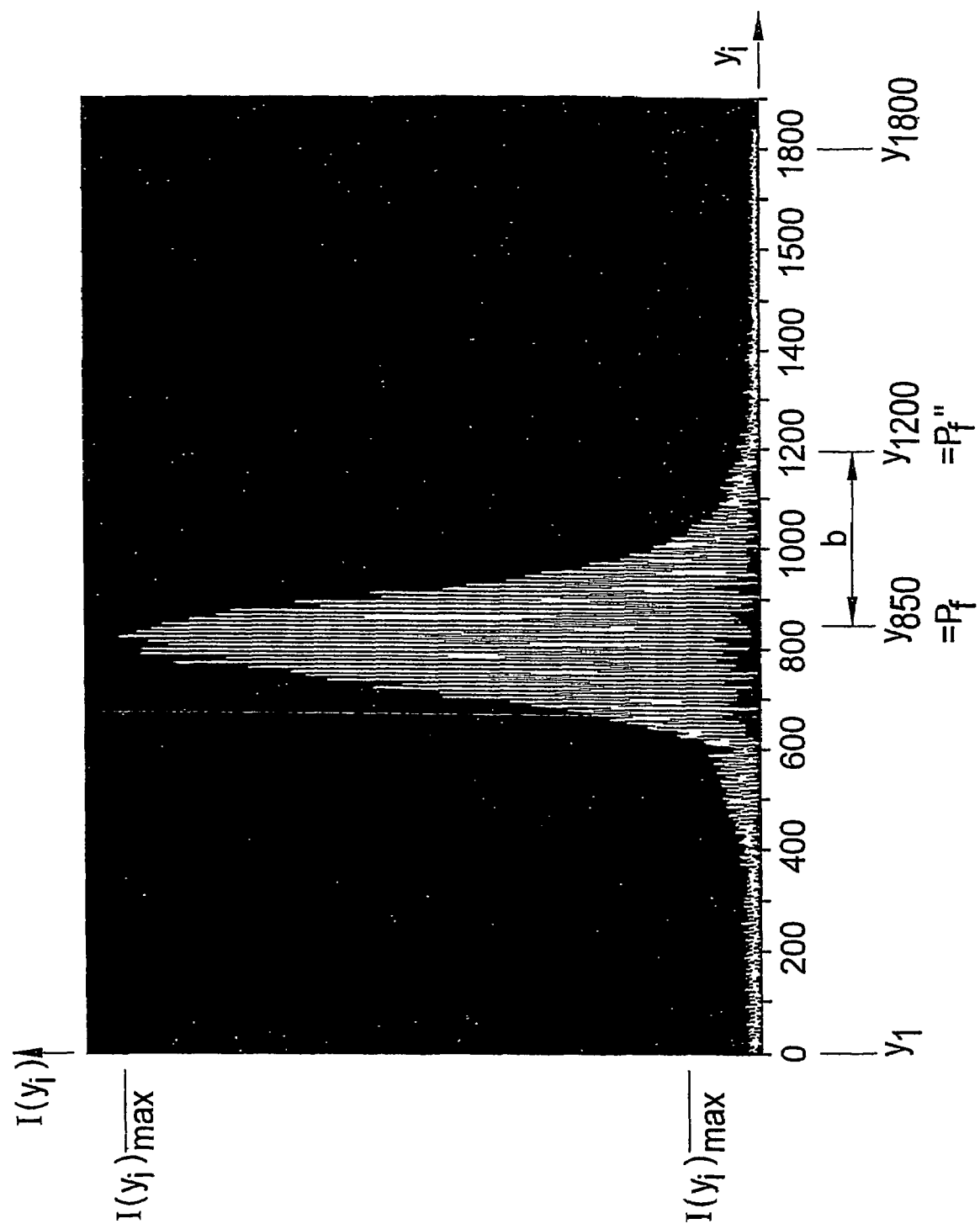
Fig. 5 is the curve of contrast values resulting according to the intensity curve from fig. 4, Fig. 6 ~~schematically depicts~~ the equipment of ~~the set-up~~ an arrangement according to the invention with an evaluation device and a positioning device for automatic focusing.

Fig. 5 reveals that the contrast values $I(y_i)$ in the range of $y_{600}$ to $y_{1100}$ are significantly greater than in the other ranges of the CCD line 19.

According to the invention, the contrast focus is determined in another step from the contrast values I($y_i$) according to the function $$P_f = \frac{\sum_i y_i \cdot I(y_i)}{\sum_i I(y_i)}$$

for all contrast values I($y_i$) greater than a default minimum value $I_{min}$. In the present case, $I_{min}$ was i.e. preset ~~with an amount~~ at a value as represented in fig. 5.

This contrast focus can be assigned to a location in the CCD line 19 approximately situated in the selected example in position $y_{850}$. This current focus position $P_f$ is now determined according to the invention.

In ~~an advantageous definition~~ one embodiment of the process according to the invention, the current focus position $P_f$ in the CCD line 19 is, in a next step, compared to an ideal focus position $P_f''$ that has been determined from calibration of the microscope set-up, i.e. using a plain specimen surface, here assuming that its position is $y_{1200}$.

In the represented example according to fig. 5, a distance of 350 pixels results between the positions $P_f$ and $P_f''$. The CCD line 19 shows a certain distance d between two pixels 20 respectively; from this, it can be derived that in this case, the current focus position $P_f$ is ~~away~~ separate from the ideal focus position $P_f''$ by approximately 350 times the distance d and that ~~for obtaining~~ to obtain a sharp image of the specimen surface ~~onto~~ on the receiving device 6, the focus position ~~is to~~ needs to be corrected.

This correction usually is effected by changing the distance Δz between the specimen 4 and the lens 3.

In practice, the distances d between the different pixels in the CCD line used are determined by measurements for accuracy reasons, and the set-up is calibrated according to the result of measurement and is used for specimen evaluation in calibrated state.

Figure 6:
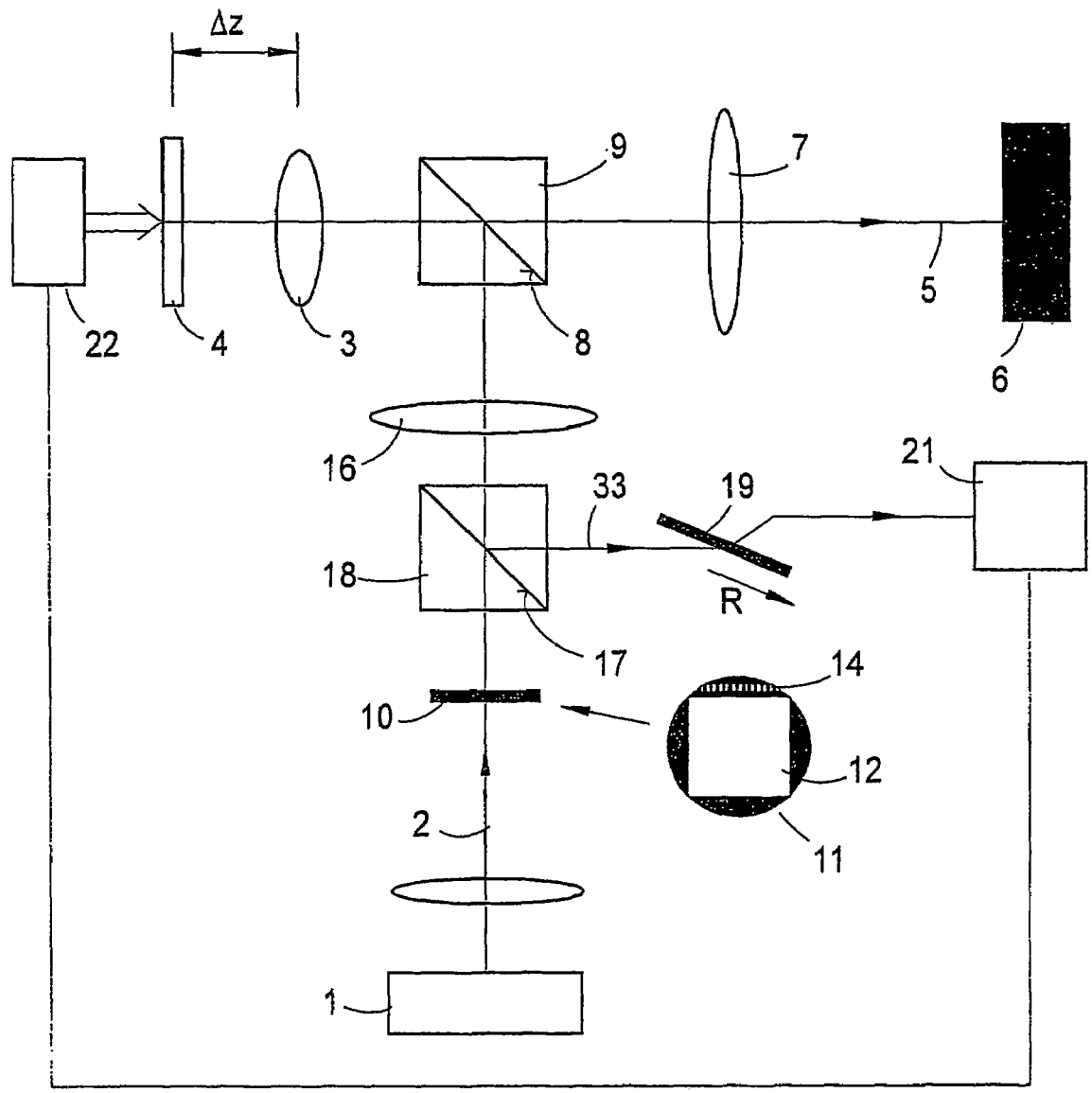

To process the intensity values I($x_i$) in the afore-described way and also for automatic focusing, the microscope set-up is additionally equipped with an evaluation device 21 as represented in fig. 6 and positioning device 22 with the CCD line 19 connected with the evaluation device 21 and the evaluation device 21 connected with the positioning device 22 using signaling pathways.

The evaluation device 21 includes a difference ~~former~~ generator for determining the position-related contrast values I($y_i$) and a computation circuit for determining the contrast focus as equivalent of the current focus position $P_f$. The evaluation device 21 also is equipped with means for presetting a value n = 1 ...20 and a minimum value $I_{min}$.

In addition, a computation circuit is provided for in the evaluation device 21, according to the design example in fig. 6, for determining the distance b between the current focus position $P_f$ and the location in the CCD line 19 corresponding to the ideal focus position $P_f''$. This computation circuit is also able to generate an adjusting command using the positioning device 22 for changing the distance Δz between the specimen 4 and the lens 3 by an amount equivalent to the distance b in a preset direction R.

To displace the current focus position $P_f$ in the CCD line 19 towards R, an adjusting command is ~~to be~~ generated providing that the distance between lens 3 and specimen 4 is increased. Vice versa, this distance needs to be reduced using adjusting commands if the current focus position $P_f$ is to be displaced ~~opposed towards~~ away from R. When the current focus position $P_f$ is overlapping with the ideal focus position $P_f''$ after executing the adjusting commands, automatic focusing is completed.

~~In a special process option according to claim 4~~ Optionally, meeting the higher requirement for precision of automatic focusing, it is intended that the evaluation device 21, in consideration of all contrast values $I(y_i)$ greater than a default minimum value $I_{min}$, will first determine a location $P_f'$ in the CCD line 19 and only then, in a following step, determine the current focus position $P_f$, in consideration of all contrast values $I(y_i)$ greater than the default minimum value $I_{min}$ not being farther from the location $P_f'$ than by a default distance a.

This two-stage process avoids the influence of focusing disorders by determining a corrected contrast focus which is taken as a basis for determining the current focus position $P_f$.

To determine the focus position relative to an interface on or in the specimen belonging to a layer system with several interfaces, measures can be taken to increase the contrast for the maxima and minima represented in fig.4. This is i.e. obtained by adjusting the ~~lattice gap length~~grid spacing.

~~This allows to change the maximum length according to the lattice gap.~~ Selecting a very narrow lattice gap also involves a narrow intensity distribution. This produces "confocal" conditions, and the light reflected by other interfaces does not reach the CCD line 19. In this way, the contrast of the lattice bands imaged onto the CCD line 19 can be increased so that glass/water interfaces with a distinctive lower reflection close to glass/air interfaces can be focused precisely also allowing a precise measurement of their distance ~~to~~ from each other.

Figure 7:
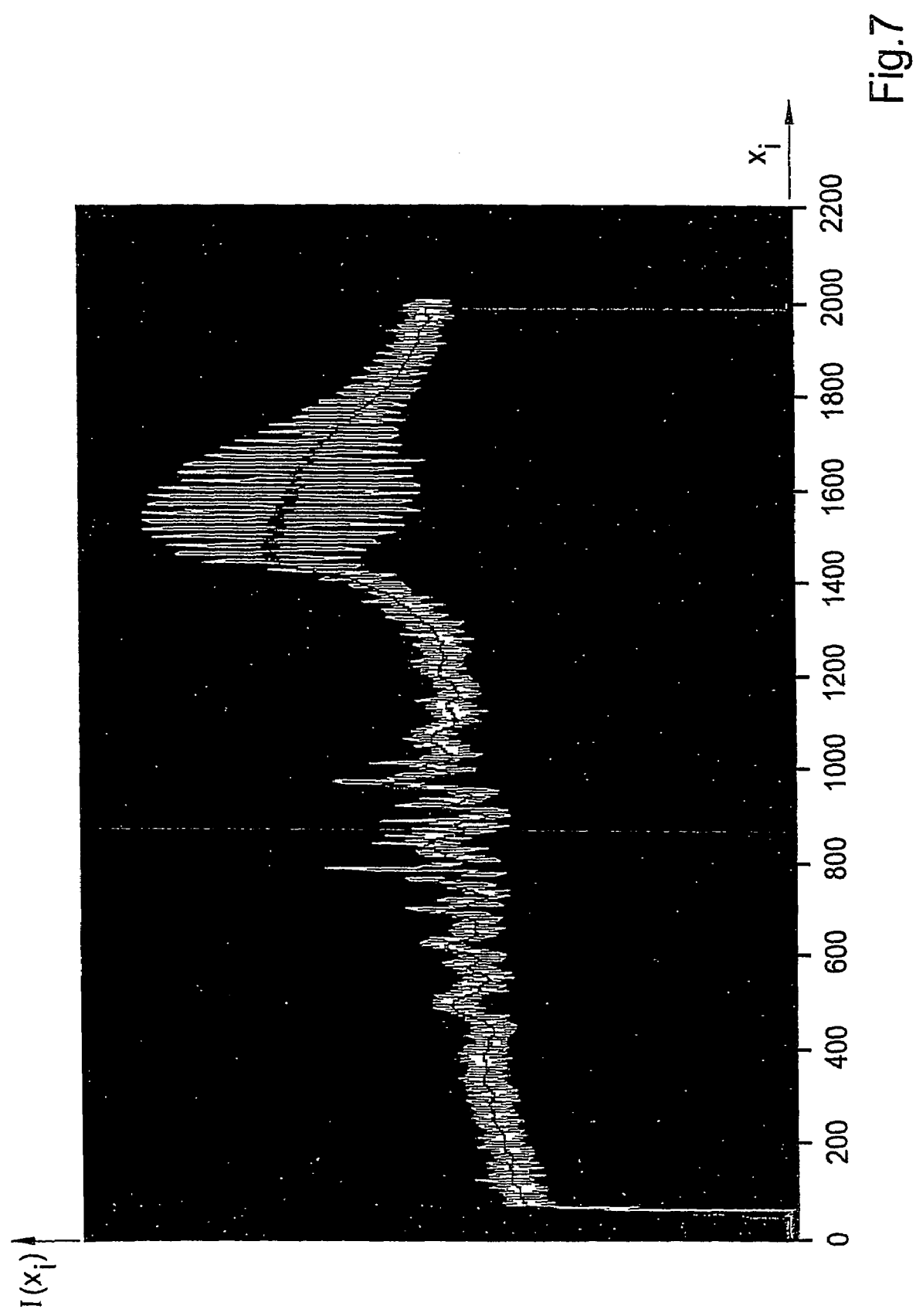
Fig. 7 is a depiction of the typical intensity curve when imaging a glass/water interface onto the CCD line.

In this regard, fig. 7 shows the intensity curve when imaging a glass/water interface to the CCD line 19. The ~~disorders~~ variations ~~which can be detected~~ visible in the range of $x_{500}$ to $x_{1100}$ are due to adjacent scattering interfaces with a distance of approx. 150 μm to each other.

Figure 8:
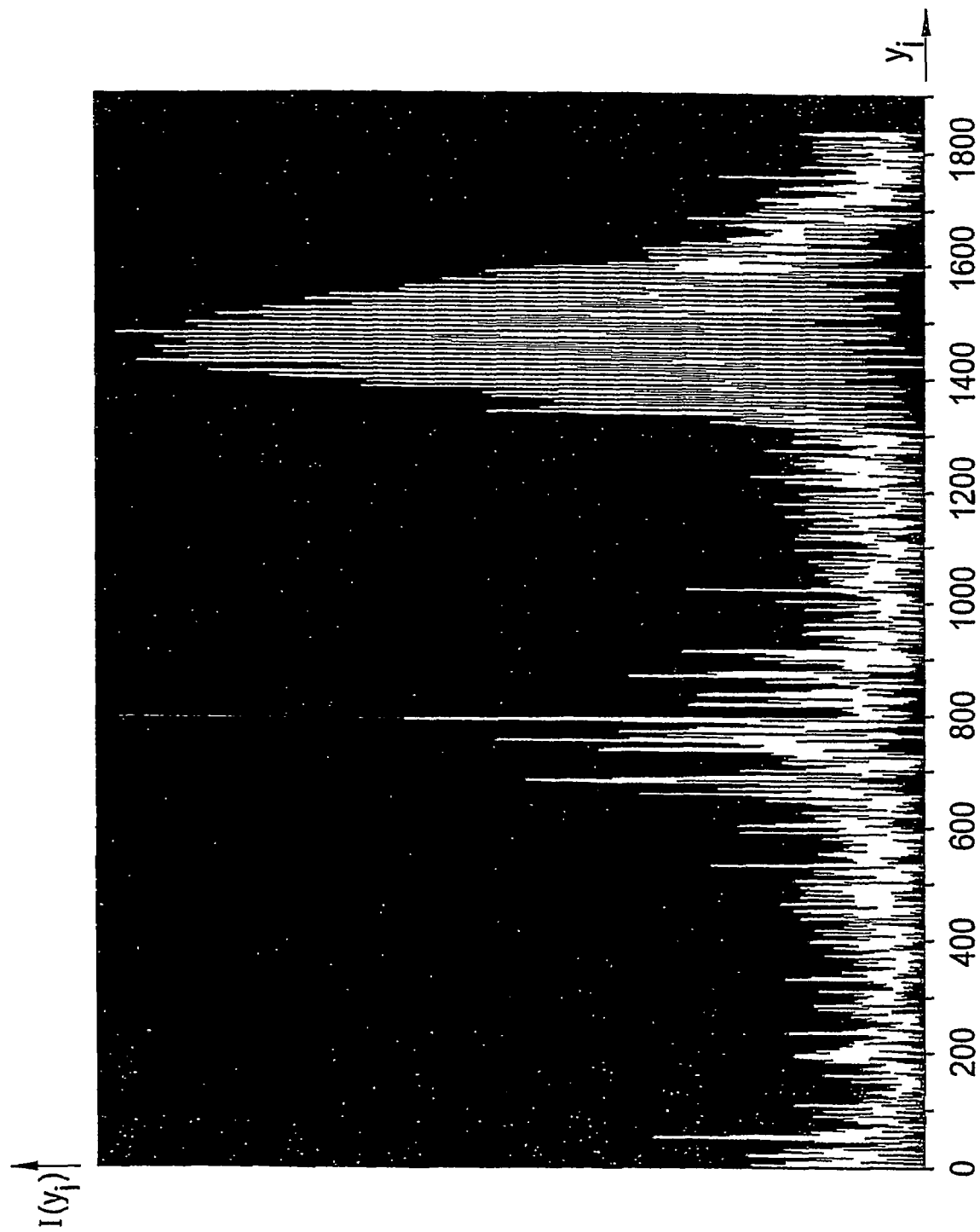
Fig. 8 is a depiction of the curve of contrast values resulting according to the intensity curve from fig. 7.

Further processing of the intensity values $I(x_i)$ represented in fig.7 in the described way leads to position-related contrast values $I(y_i)$ as represented in fig. 8.

In ~~the designs of the set up~~ embodiments according to the invention previously ~~exposed~~ discussed, both the aperture 12 and the gap opening 14, as components of the aperture set-up, are aligned ~~vertical~~ perpendicular to the optical axis 2 of the illumination optical path. This results in excellent results ~~of measurement~~ when evaluating specimen 4 whose surface ~~is scattered to a minor degree only~~ demonstrates only minor degrees of scattering.

Figure 9:
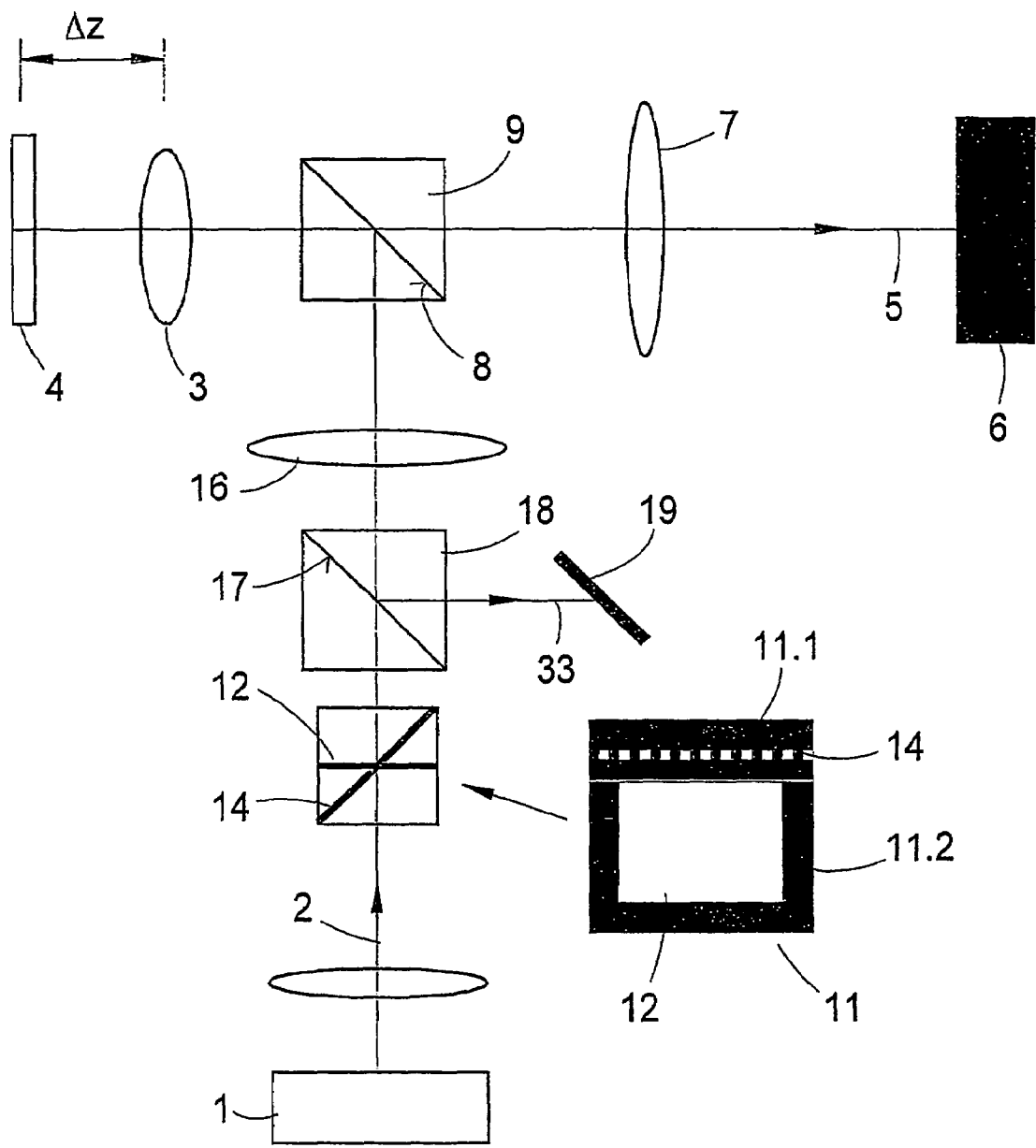
Fig. 9 is a schematic depiction of ~~the design of the set-up~~ an embodiment according to the invention with inclined receiving device and inclined gap opening.

Fig. 9, however, represents a set-up according to the invention ~~in a design~~ suitable ~~in particular~~ for examining specimens 4 with relatively high-scattering surfaces.

As in the ~~design~~ examples previously ~~exposed~~ discussed, ~~also according to the design~~ in fig. 9, the aperture set-up 11 positioned in the field stop plane 10 shows a gap opening 14 and an aperture 12. ~~Also here, the~~ The gap opening 14 is used to determine the focus position and the aperture 12 for defining the perimeter and size of an image detail in specimen 4.

The aperture 12 is aligned approximately ~~centrical to~~ centered on the optical axis 2 of the illumination optical path and the gap opening 14 is situated in the periphery of the illumination optical path.

~~As an exception, the~~ The gap opening 14 here includes an angle with the optical axis 2 ~~whose amount equals the amount~~ equal to the angle by which the CCD line 19 is inclined ~~against~~ relative to the optical axis 33 of the detection optical path ~~whereas~~ while the aperture 12 is still aligned ~~vertical~~ perpendicular to the optical axis 2 of the illumination optical path.

In addition, the optical path between the specimen 4 and the gap opening 14 is ~~as long as~~ equal in length to the optical path between the specimen 4 and the CCD line 19.

Such an aperture set-up 11 can i.e. be realized technically by separately manufacturing an aperture part 11.1 with the gap opening 14 and an aperture part 11.2 with the apertures 12 which are connected afterwards.

The requirement of equal optical path lengths between the gap opening 14 and the specimen 4 on the one hand and the specimen 4 and the CCD line 19 on the other hand is met in the represented case when the intersection point at which optical axis 2, optical axis 33 and dividing surface 17 of the beam splitter 18 meet, have the same distance to the intersection point of the optical axis 2 with the gap opening 14 as the intersection point of the optical axis 33 with the CCD line 19.

Figure 10:
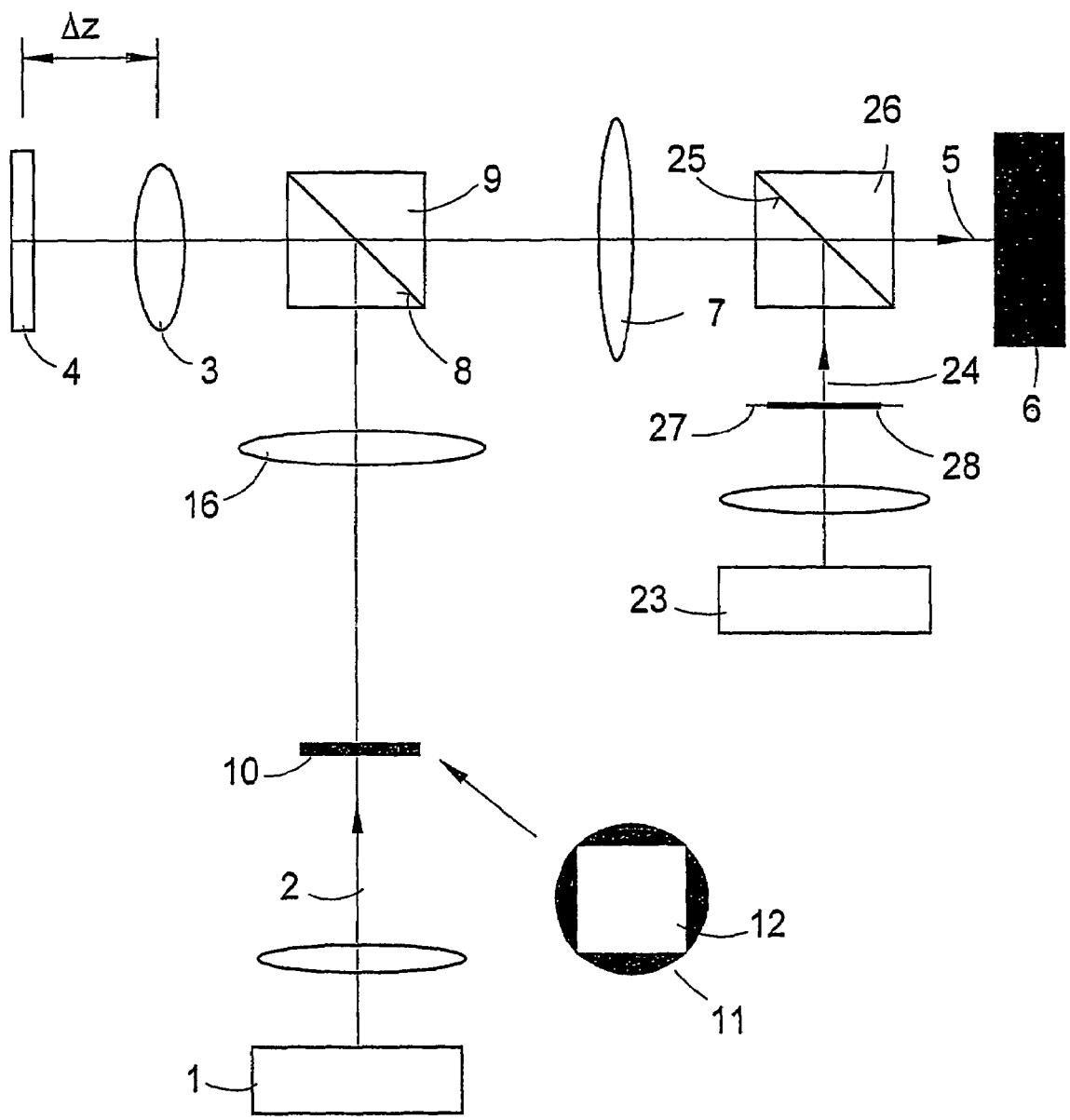
Fig. 10 is a schematic depiction of ~~an option of the set-up~~ another embodiment according to the invention for precise determination of the focus position and tipping of the specimen plane relative to the reception surface in the receiving device.

A set-up for executing another option of the process according to the invention is represented in fig. 10. This set-up is suitable for applications that also require, besides the precise determination of the focus position, the tipping of the specimen plane relative to the reception surface of the receiving device 6.

For the purpose of clarity, the same reference numerals for the same components, if possible, are used as in fig. 1.

The difference between the set-up according to fig. 10 and the set-up according to fig. 1 is that a second illumination source 23 is provided for to originate a second illumination optical path 24 directed towards the specimen 4. The illumination optical path 24 is deflected in the dividing layer 25 of an additional beam splitter 26 towards the specimen 4 and merged in the beam splitter 9 with the optical axis 2 of the illumination optical path originated from the illumination source 1.

Figure 11:
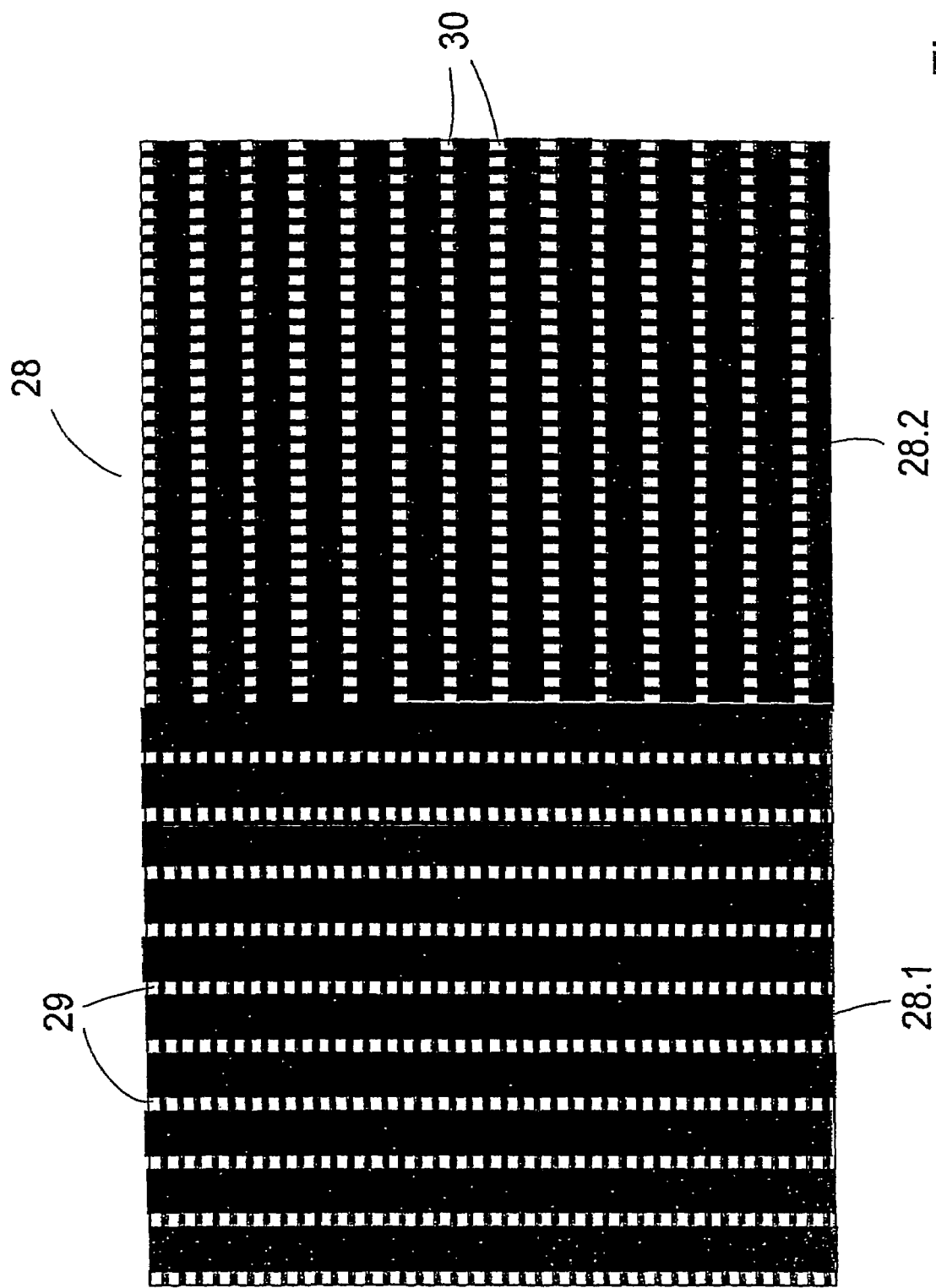
Fig. 11 is a magnified representation of an aperture ~~set-up~~ arrangement from fig. 10.

There is an aperture set-up 28 in the field stop plane 27 ~~represented magnified~~ depicted enlarged in fig. 11. The aperture set-up 28 consists of two half apertures 28.1 and 28.2 both set up next to each other in the illumination optical path 24 to completely fill the image area intended for imaging onto the specimen 4.

The illumination sources 1 and 23 are operated alternatively, that is, the illumination source 1 is used for imaging the specimen surface onto the CCD camera of the receiving device 6 for observation and evaluation purposes whereas the illumination source 23 is used only for determining the current focus position and the tipping angle of specimen 4 against the reception surface of the receiving device 6.

Each of the two half apertures 28.1 and 28.2 consists of a number of gap openings 29 and 30 running parallel to each other, with each of them including the gap opening 14, being superposed by a lattice structure in the set-up according to the fig. 1. The gap openings 29 of the half aperture 28.1 are aligned ~~vertical~~ perpendicular to the gap openings 30 of the half aperture 28.2.

The ~~lattice~~ grid structures are aligned ~~vertical~~ perpendicular to the gap openings 29 and 30 respectively, that is, the lattice vectors run parallel to the respective gap opening 29 or 30.

~~A beveled~~ An angled CCD line 19, as in the set-up according to fig.1, is not required here. The aperture set-up 28 is imaged onto a CCD matrix in the receiving device 6 after the imaging light coming from the specimen 4 has passed the lens 3, the beam splitter 9, the field lens 7 and the beam splitter 26.

Figure 12:
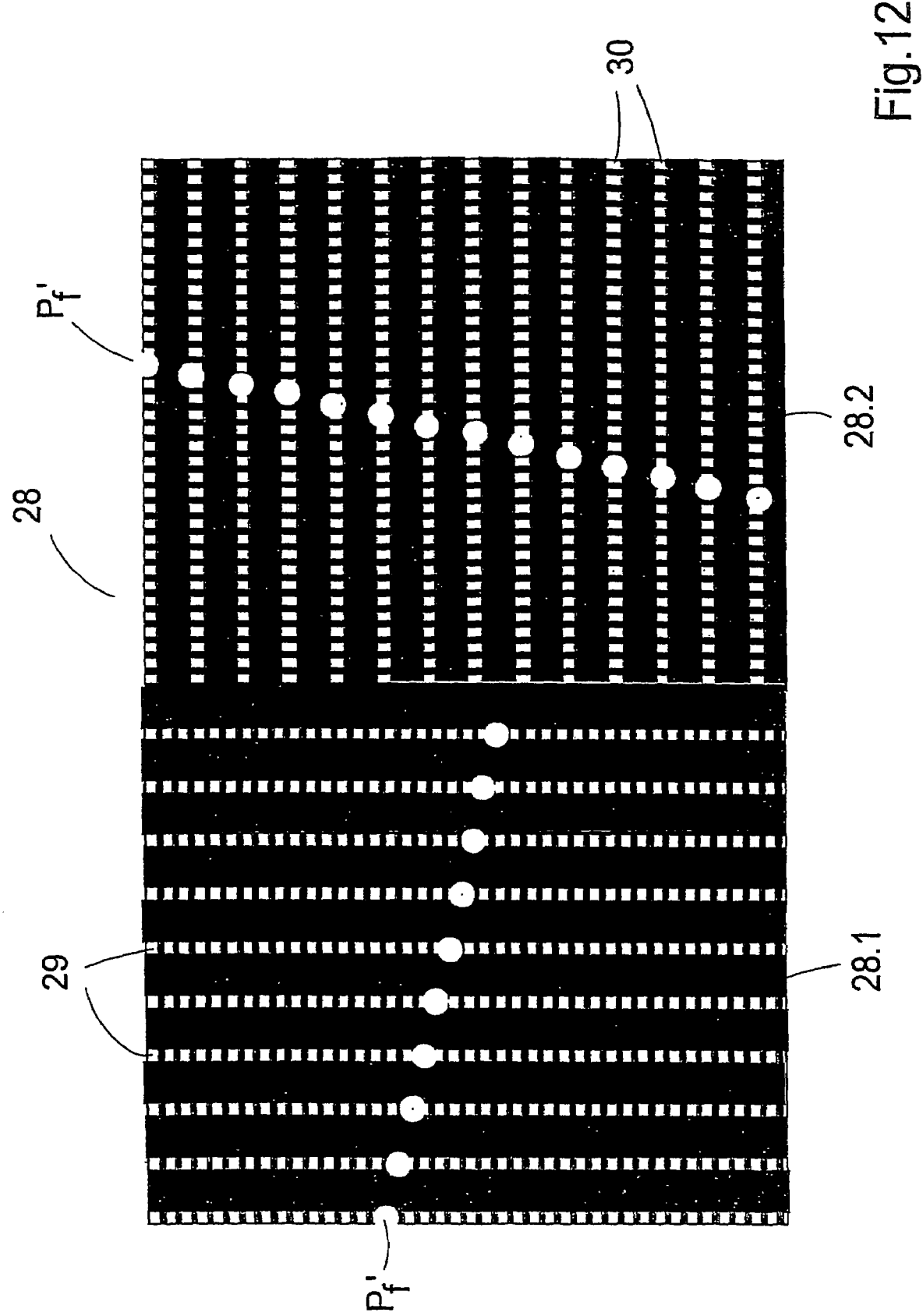
Fig. 12 is a depiction of the outline of the contrast focuses in the pixel lines of a CCD matrix of the ~~set-up~~ arrangement according to fig. 10.
Figure 13:
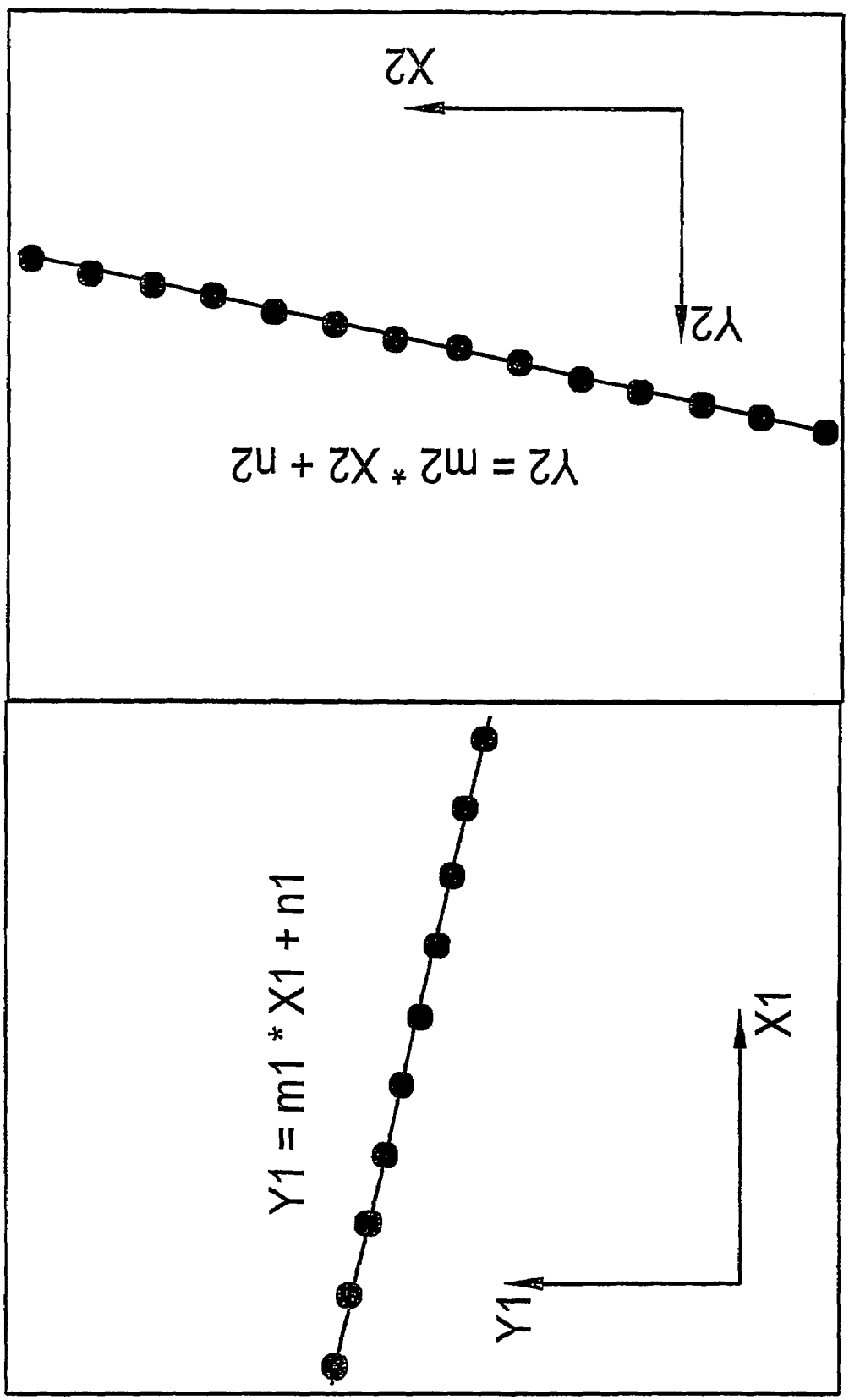
Fig. 13 is an example of the connecting lines through the contrast focuses

Fig. 12 shows a symbolic representation of the CCD matrix with the pixel lines 31 and 32 required by the image of the gap openings 29 and 30.

Each of the gap openings 29 including the lattice structure in the pixel line 31 is imaged onto the CCD matrix generating intensity signals $I(x_i)$ available at the signal output of each pixel. This also applies to the gap openings 30 imaged onto one pixel line 32 respectively in the CCD matrix including the lattice structure.

As already described ~~further~~ above for an individual CCD line 19 according to fig. 1, ~~also~~ in this process option, the intensity values $I(x_i)$ determined are combined ~~to~~ with position-related contrast values $I(y_i)$. In ~~exactly~~ the way described above, a contrast focus indicating the current focus position $P_f$ respectively can be determined.

The contrast focuses can be connected by straight lines for each imaged half aperture 28.1 or 28.2. The two straight lines are defined by the corresponding straight line equations $y_1=m_1*x_1+n_1$ and $y_2=m_2*x_2+n_2$.

The variables $n_1$ and $n_2$ ~~make a~~ measure ~~for~~ the current focus position in a calibrated state. If $n_1$ and $n_2$ correspond to a default distance value, the imaging optics ~~is~~ are focused.

In addition, based on the mathematical relations from the variable $m_1$ describing the ~~gradient~~ slope of the straight line $y_1=m_1*x_1+n_1$ and consequently the deviation from the parallel alignment towards the pixel lines 31 and 32, the first tipping angle and the second tipping angle from $m_2$ of the focus plane are determined related to the plane of specimen 4.

It is assumed that, in calibrated state of the set-up, the variables $m_1$ and $m_2$ are proportional to a tipping angle of the focus plane related to the plane of the specimen 4.

When tipping the plane of specimen 4 intentionally until the two variables $m_1$ and $m_2$ correspond to a setpoint value, preferably the value "zero", tipping is corrected.